United States Patent
Kim et al.

(10) Patent No.: US 12,229,915 B2
(45) Date of Patent: Feb. 18, 2025

(54) IMAGE PROVIDING METHOD AND APPARATUS USING ARTIFICIAL INTELLIGENCE, AND DISPLAY METHOD AND APPARATUS USING ARTIFICIAL INTELLIGENCE

(71) Applicant: SAMSUNG ELECTRONICS CO., LTD., Suwon-si (KR)

(72) Inventors: Jaehwan Kim, Suwon-si (KR); Youngo Park, Suwon-si (KR); Jongseok Lee, Suwon-si (KR); Chaeeun Lee, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 17/895,416

(22) Filed: Aug. 25, 2022

(65) Prior Publication Data

US 2023/0052330 A1 Feb. 16, 2023

Related U.S. Application Data

(63) Continuation of application No. PCT/KR2022/012103, filed on Aug. 12, 2022.

(30) Foreign Application Priority Data

Aug. 13, 2021 (KR) .................. 10-2021-0107626

(51) Int. Cl.
  *G09G 5/00* (2006.01)
  *G06T 3/4046* (2024.01)
(52) U.S. Cl.
  CPC .................. *G06T 3/4046* (2013.01)

(58) Field of Classification Search
  CPC . G06T 11/001; G06T 3/40; G06T 7/11; G06T 2207/10024; G06T 2207/20081;
  (Continued)

(56) References Cited

U.S. PATENT DOCUMENTS 10,825,139 B2  11/2020  Kim et al.
10,825,205 B2  11/2020  Kim et al.
(Continued)

FOREIGN PATENT DOCUMENTS

CN  107018422 A  8/2017
JP  202010331 A  1/2020
(Continued)

OTHER PUBLICATIONS

Kim et al., "Dynamic frame resizing with convolutional neural network for efficient video compression," Proceedings of SPIE, vol. 10396, Sep. 2017, Total 14 pages.
(Continued)

*Primary Examiner* — Gordon G Liu
(74) *Attorney, Agent, or Firm* — Sughrue Mion, PLLC

(57) ABSTRACT

Provided is an electronic apparatus configured to provide an image based on artificial intelligence (AI), the electronic apparatus including a processor configured to execute one or more instructions stored in the electronic apparatus to obtain a first image by AI-downscaling an original image by a downscaling neural network, obtain first image data by encoding the first image, based on a display apparatus not supporting an AI upscaling function, obtain a second image by decoding the first image data, obtain a third image by AI-upscaling the second image by an upscaling neural network, and provide, to the display apparatus, second image data obtained by encoding the third image.

17 Claims, 24 Drawing Sheets

(58) Field of Classification Search
CPC ......... G06T 2207/20084; G06T 3/4046; G06T 9/00; G06T 9/002; G06N 3/04; G06N 3/08; G06N 3/045
USPC .......................................................... 345/660
See application file for complete search history.

(56) References Cited

U.S. PATENT DOCUMENTS

| | | | |
|---|---|---|---|
| 11,303,958 B2 | 4/2022 | Choi et al. | |
| 2018/0108114 A1 | 4/2018 | Boshra-Riad | |
| 2020/0014603 A1 | 1/2020 | Kuo et al. | |
| 2020/0053362 A1 | 2/2020 | Fu et al. | |
| 2020/0126187 A1* | 4/2020 | Park | H04N 19/85 |
| 2021/0056666 A1 | 2/2021 | Park et al. | |
| 2021/0227290 A1 | 7/2021 | Ko et al. | |
| 2022/0030260 A1 | 1/2022 | Park et al. | |
| 2022/0138904 A1 | 5/2022 | Kim et al. | |
| 2022/0207650 A1 | 6/2022 | Kim et al. | |
| 2022/0210213 A1* | 6/2022 | Petrovic | H04L 65/752 |

FOREIGN PATENT DOCUMENTS

| | | |
|---|---|---|
| KR | 10-1323608 B1 | 11/2013 |
| KR | 10-2019-0081413 A | 7/2019 |
| KR | 1020200044661 A | 4/2020 |
| KR | 1020200044666 A | 4/2020 |
| KR | 10-2020-0102879 A | 9/2020 |
| KR | 10-2166337 B1 | 10/2020 |
| KR | 10-2021-0093605 A | 7/2021 |

OTHER PUBLICATIONS

International Search Report (PCT/ISA/210) and Written Opinion (PCT/ISA/237) dated Nov. 17, 2022 issued by the International Searching Authority in International Application No. PCT/KR2022/012103.

"What is AI Upscaling", NVIDIA Blog, Feb. 3, 2020, pp. 1-5.

Communication issued on May 13, 2024 by the European Patent Office for European Patent Application No. 22856281.5.

* cited by examiner

FIG. 5

| IMAGE-RELATED INFORMATION | NEURAL NETWORK SETTING INFORMATION |
|---|---|
| SD, 10Mbps, AV1 | "A" NEURAL NETWORK SETTING INFORMATION |
| HD, 15Mbps, H.264 | "B" NEURAL NETWORK SETTING INFORMATION |
| Full HD, 20Mbps, HEVC | "C" NEURAL NETWORK SETTING INFORMATION |
| Full HD, 15Mbps, HEVC | "D" NEURAL NETWORK SETTING INFORMATION |

FIG. 17

| FIRST NEURAL NETWORK SETTING INFORMATION | SECOND NEURAL NETWORK SETTING INFORMATION |
|---|---|
| A1 | A2 |

FIG. 18

| FIRST NEURAL NETWORK SETTING INFORMATION | SECOND NEURAL NETWORK SETTING INFORMATION |
|---|---|
| A1 | A2 |
| B1 | B2 |
| C1 | C2 |
| D1 | D2 |

FIG. 19

| FIRST NEURAL NETWORK SETTING INFORMATION | SECOND NEURAL NETWORK SETTING INFORMATION |
|---|---|
| A1 (x1/4) | A2 (x4) |
| | B2 (x2) |
| | C2 (x3) |
| | D2 (x8) |

FIG. 20

| FIRST NEURAL NETWORK SETTING INFORMATION | SECOND NEURAL NETWORK SETTING INFORMATION |
|---|---|
| A1 (x1/4) | A2-1 (x4) |
| | A2-2 (x2) |
| | A2-3 (x3) |
| | A2-4 (x8) |
| B1 (x1/4) | B2-1 (x4) |
| | B2-2 (x2) |
| | B2-3 (x3) |
| | B2-4 (x8) |

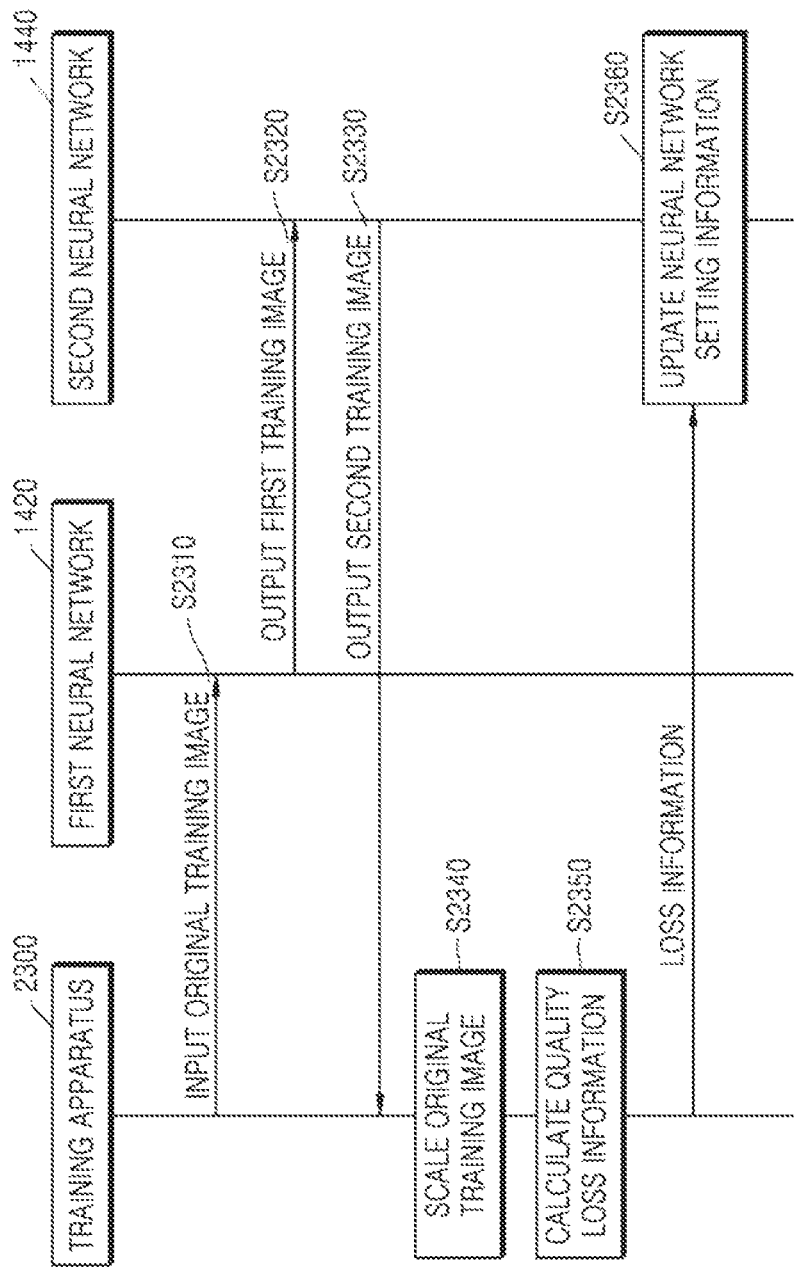

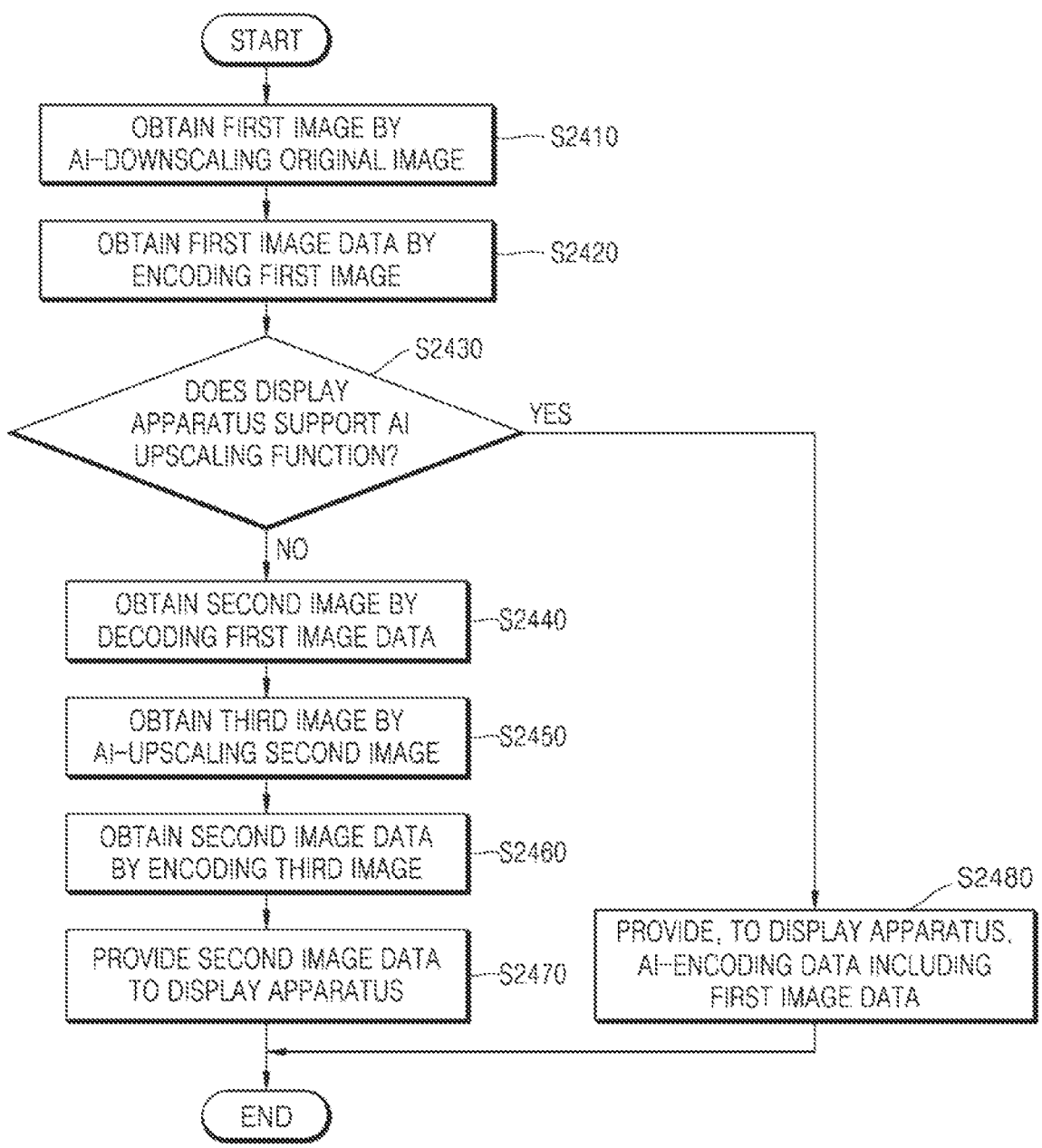

IMAGE PROVIDING METHOD AND APPARATUS USING ARTIFICIAL INTELLIGENCE, AND DISPLAY METHOD AND APPARATUS USING ARTIFICIAL INTELLIGENCE

This application is a bypass continuation application of International Application No. PCT/KR2022/012103, filed on Aug. 12, 2022, which is based on and claims the priority to Korean Patent Application No. 10-2021-0107626, filed on Aug. 13, 2021, in the Korean Intellectual Property Office, the disclosures of which are incorporated by reference herein in their entireties

TECHNICAL FIELD

Technical Field

The disclosure relates to a field of image processing. More particularly, the disclosure relates to a method and apparatus for processing and displaying an image by using artificial intelligence (AI).

Background Art

An image is encoded by a codec conforming to a certain data compression standard, for example, a Moving Picture Expert Group (MPEG) standard, and the encoded image is stored in a recording medium in a bitstream form or is transmitted through a communication channel.

With the development and spread of hardware capable of reproducing and storing high-resolution, high-definition images, there is an increasing need for a codec capable of effectively encoding and decoding high-resolution, high-definition images.

SUMMARY

One or more embodiments provide an image providing method and apparatus using artificial intelligence (AI) and a display method and apparatus using AI, wherein images are encoded and decoded using AI so as to prevent saturation of storage capacity and achieve a low bitrate.

One or more embodiments provide an image providing method and apparatus using artificial intelligence (AI) and a display method and apparatus using AI, wherein, for a display apparatus that does not support an AI function, the image providing apparatus processes images using AI and provides the processed images to the display apparatus, thereby maintaining compatibility therebetween.

According to an embodiment of the disclosure, an electronic apparatus configured to provide an image by using artificial intelligence (AI) includes a processor configured to execute one or more instructions stored in the electronic apparatus to obtain a first image by AI-downscaling an original image through a downscaling neural network, obtain first image data by encoding the first image, when a display apparatus does not support an AI upscaling function, obtain a second image by decoding the first image data, obtain a third image by AI-upscaling the second image through an upscaling neural network, and provide, to the display apparatus, second image data obtained by encoding the third image.

In an image providing method and apparatus using artificial intelligence (AI) and a display method and apparatus using AI, according to embodiments of the disclosure, images may be processed at a low bitrate through AI-based image encoding and decoding, and the storage capacity of the apparatus may be prevented from being saturated.

In addition, in an image providing method and apparatus using artificial intelligence (AI) and a display method and apparatus using AI, according to embodiments of the disclosure, for the display apparatus that does not support the AI function, the image providing apparatus processes images using AI and provides the processed images to the display apparatus, thereby maintaining compatibility therebetween.

BRIEF DESCRIPTION OF THE DRAWINGS

These and/or other aspects will become apparent and more readily appreciated from the following description of the example embodiments, taken in conjunction with the accompanying drawings in which:

FIG. 5 is a diagram illustrating a mapping relationship between various pieces of image-related information and various pieces of neural network setting information;

FIG. 17 is a diagram illustrating first neural network setting information applicable to a first neural network for AI downscaling and second neural network setting information applicable to a second neural network for AI upscaling;

FIG. 18 is a diagram illustrating a plurality of first neural network setting information applicable to a first neural network for AI downscaling and a plurality of second neural network setting information applicable to a second neural network for AI upscaling;

FIG. 19 is a diagram illustrating first neural network setting information applicable to a first neural network for AI downscaling and a plurality of second neural network setting information applicable to a second neural network for AI upscaling;

FIG. 20 is a diagram illustrating a plurality of first neural network setting information applicable to a first neural network for AI downscaling and a plurality of second neural network setting information applicable to a second neural network for AI upscaling;

FIG. 23 is a diagram illustrating a process, performed by a training apparatus, of individually training a second neural network; and FIG. 24 is a flowchart of an image providing method according to an embodiment of the disclosure.

DETAILED DESCRIPTION

Figure 1:
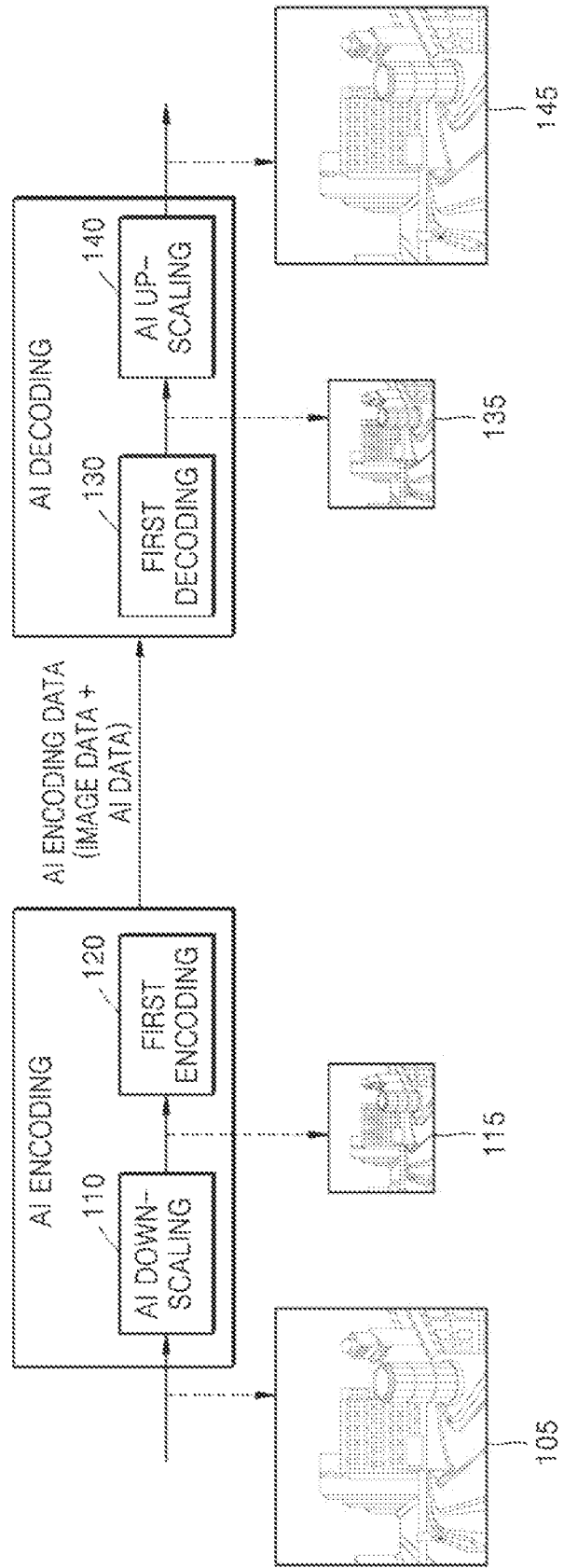
FIG. 1 is a diagram illustrating an artificial intelligence (AI) encoding process and an AI decoding process, according to an embodiment of the disclosure.

According to an aspect of an embodiment, there is provided an electronic apparatus configured to provide an image based on artificial intelligence (AI), the electronic apparatus including a processor configured to execute one or more instructions stored in the electronic apparatus to obtain a first image by AI-downscaling an original image by a downscaling neural network, obtain first image data by encoding the first image, based on a display apparatus not supporting an AI upscaling function, obtain a second image by decoding the first image data, obtain a third image by AI-upscaling the second image by an upscaling neural network, and provide, to the display apparatus, second image data obtained by encoding the third image.

The electronic apparatus may further include a camera configured to obtain the original image.

The processor may be further configured to, based on the display apparatus supporting the AI upscaling function, provide the first image data to the display apparatus.

The processor may be further configured to obtain the first image by AI-downscaling the original image by a downscaling neural network to which predetermined first neural network setting information is applied, select second neural network setting information corresponding to a supported resolution of the display apparatus from among a plurality of second neural network setting information, and obtain the third image by AI-upscaling the second image by an upscaling neural network to which the selected second neural network setting information is applied.

The predetermined first neural network setting information and second neural network setting information corresponding to the predetermined first neural network setting information from among the plurality of second neural network setting information may be obtained through a joint training of the downscaling neural network and the upscaling neural network, and second neural network setting information other than the second neural network setting information corresponding to the predetermined first neural network setting information from among the plurality of second neural network setting information may be obtained through an individual training of the upscaling neural network after the joint training.

The processor may be further configured to obtain the first image by AI-downscaling the original image by a downscaling neural network to which predetermined first neural network setting information is applied, and obtain the third image by AI-upscaling the second image n times, where n is a natural number, through an upscaling neural network, based on a scaling factor of the upscaling neural network to which predetermined second neural network setting information is applied and a supported resolution of the display apparatus.

The processor may be further configured to select first neural network setting information for the AI downscaling from among a plurality of first neural network setting information, obtain the first image by AI-downscaling the original image through a downscaling neural network to which the selected first neural network setting information is applied, select second neural network setting information corresponding to the selected first neural network setting information from among a plurality of second neural network setting information, and obtain the third image by AI-upscaling the second image n times, where n is a natural number, through an upscaling neural network, based on a scaling factor of the upscaling neural network to which the selected second neural network setting information is applied and a supported resolution of the display apparatus.

As original frames included in the original image are sequentially AI-downscaled by the downscaling neural network, first frames included in the first image may be obtained, and the processor may be further configured to sequentially delete the original frames that the AI downscaling is completed.

As second frames included in the second image are sequentially AI-upscaled by the upscaling neural network, third frames included in the third image may be obtained, and the processor may be further configured to, based on third frames included in a group of pictures (GOP) being obtained through the AI upscaling, encode the third frames included in the GOP and delete the third frames included in the GOP that the encoding is completed.

The processor may be further configured to receive performance information from the display apparatus, and determine, from the performance information, whether the AI upscaling function is supported and the supported resolution of the display apparatus.

According to another aspect of an embodiment, there is provided an electronic apparatus configured to display an image by using artificial intelligence (AI), the electronic apparatus including a display, and a processor configured to execute one or more instructions stored in the electronic apparatus to transmit, to an image providing apparatus, information indicating that the electronic apparatus supports an AI upscaling function, receive, from the image providing apparatus, image data corresponding to a result of a first encoding process on a first image and AI data related to AI downscaling from an original image to the first image, obtain a second image by decoding the image data, select neural network setting information for AI upscaling from among a plurality of neural network setting information based on the AI data, obtain a third image by AI-upscaling the second image by an upscaling neural network to which the selected neural network setting information is applied, and provide the third image to the display.

According to another aspect of an embodiment, there is provided an image providing method performed by an electronic apparatus using artificial intelligence (AI), the image providing method including obtaining a first image by AI-downscaling an original image by a downscaling neural network, obtaining first image data by encoding the first image, obtaining a second image by decoding the first image data based on a display apparatus not supporting an AI upscaling function, obtaining a third image by AI-upscaling the second image by an upscaling neural network, and providing, to the display apparatus, second image data obtained by encoding the third image.

A non-transitory computer-readable recording medium having recorded thereon a program for causing a computer to perform the image providing method.

According to another aspect of an embodiment, there is provided an image display method performed by an electronic apparatus using artificial intelligence (AI), the image display method including transmitting, to an image providing apparatus, information indicating that the electronic apparatus supports an AI upscaling function, receiving, from the image providing apparatus, image data corresponding to a result of a first encoding on a first image and AI data corresponding to AI downscaling from an original image to the first image, obtaining a second image by decoding the image data, selecting neural network setting information for AI upscaling from among a plurality of neural network setting information based on the AI data, obtaining a third image by AI-upscaling the second image by an upscaling neural network to which the selected neural network setting information is applied, and providing the third image to a display.

The image providing method may further include obtaining the original image by a camera.

The image providing method may further include providing the first image data to the display apparatus based on the display apparatus supporting the AI upscaling function.

The image providing method may further include obtaining the first image by AI-downscaling the original image by a downscaling neural network to which predetermined first neural network setting information is applied, selecting second neural network setting information corresponding to a supported resolution of the display apparatus from among a plurality of second neural network setting information, and obtaining the third image by AI-upscaling the second image by an upscaling neural network to which the selected second neural network setting information is applied.

The predetermined first neural network setting information and second neural network setting information corresponding to the predetermined first neural network setting information from among the plurality of second neural network setting information may be obtained through a joint training of the downscaling neural network and the upscaling neural network, and second neural network setting information other than the second neural network setting information corresponding to the predetermined first neural network setting information from among the plurality of second neural network setting information may be obtained through an individual training of the upscaling neural network after the joint training.

The image providing may further include obtaining the first image by AI-downscaling the original image by a downscaling neural network to which predetermined first neural network setting information is applied, and obtaining the third image by AI-upscaling the second image n times, where n is a natural number, through an upscaling neural network, based on a scaling factor of the upscaling neural network to which predetermined second neural network setting information is applied and a supported resolution of the display apparatus.

The image providing method may further include selecting first neural network setting information for the AI downscaling from among a plurality of first neural network setting information, obtaining the first image by AI-downscaling the original image through a downscaling neural network to which the selected first neural network setting information is applied, selecting second neural network setting information corresponding to the selected first neural network setting information from among a plurality of second neural network setting information, and obtaining the third image by AI-upscaling the second image n times, where n is a natural number, through an upscaling neural network, based on a scaling factor of the upscaling neural network to which the selected second neural network setting information is applied and a supported resolution of the display apparatus.

Throughout the disclosure, the expression "at least one of a, b or c" indicates only a, only b, only c, both a and b, both a and c, both b and c, all of a, b, and c, or variations thereof.

As the present disclosure allows for various changes and numerous embodiments of the disclosure, certain embodiments of the disclosure will be illustrated in the drawings and described in detail in the written description. However, this is not intended to limit the embodiments of the disclosure, and it will be understood that the disclosure includes all modifications, equivalents, and substitutes falling within the spirit and scope of various embodiments of the disclosure.

In describing the disclosure, when the detailed description of the relevant known functions or configurations is determined to unnecessarily obscure the gist of the disclosure, the detailed description thereof may be omitted herein. Also, numbers (e.g., first, second, etc.) used in the description of this specification are merely identification symbols for distinguishing one element from another.

When one element is referred to as "connected" or "coupled" to another element, the one element may be directly connected or coupled to the other element, but it will be understood that the elements may be connected or coupled to each other via another element therebetween unless the context clearly indicates otherwise.

An element represented by "-er(or) (unit)," "module," etc. in this specification may be one element in which two or more elements are combined, or may be divided into two or more element for each more subdivided function. Also, each of the elements to be described below may additionally perform, in addition to the main function thereof, some or all of the functions that other elements are responsible for, and some of the main functions that the respective elements are responsible for may be dedicated by other elements.

In the disclosure, an "image" or a "picture" may represent a still image, a moving image including a plurality of consecutive still images (or frames), or a video.

In the disclosure, a "neural network (NN)" is a representative example of an artificial neural network model that simulates a cranial nerve, and is not limited to an artificial neural network model using a specific algorithm. A neural network may also be referred to as a deep neural network (DNN).

In the disclosure, "parameters" are values used in an operation process of each layer constituting a neural network, and may include, for example, weights used when an input value is applied to a certain operation expression. Parameters may be expressed in a matrix form. Parameters are values set as a result of training and may be updated through separate training data as necessary.

In the disclosure, a "first neural network" refers to a neural network used for artificial intelligence (AI) downscaling of an image, and a "second neural network" refers to a neural network used for AI upscaling of an image.

In the disclosure, "neural network setting information" is information related to elements constituting a neural network and includes the above-described parameters. A neural network may be configured by using neural network setting information. Neural network setting information may be referred to as DNN configuration information.

In the disclosure, an "original image" refers to an image to be AI encoded, and a "first image" refers to an image obtained as a result of AI-downscaling an original image in an AI encoding process. Also, a "second image" refers to an image obtained through first decoding in an AI decoding process, and a "third image" refers to an image obtained by AI-upscaling a second image in an AI decoding process.

In the disclosure, "AI downscaling" refers to a process of reducing a resolution of an image based on AI, and "first encoding" refers to an encoding process performed by a frequency conversion-based image compression method. Also, "first decoding" refers to a decoding process performed by a frequency conversion-based image reconstruction method, and "AI upscaling" refers to a process of increasing a resolution of an image based on AI. In the present specification, 'first encoding' and 'first decoding' may be referred to as 'encoding' and 'decoding', respectively.

FIG. 1 is a diagram illustrating an AI encoding process and an AI decoding process, according to an embodiment of the disclosure.

As described above, as a resolution of an image increases rapidly, the amount of information to be processed for encoding and/or decoding increases, and accordingly, there is a need for a method of improving image encoding and decoding efficiency.

As illustrated in FIG. 1, according to an embodiment of the disclosure, a first image 115 is obtained by performing AI downscaling 110 on an original image 105 having a high resolution. Because a first encoding process 120 and a first decoding process 130 are performed on the first image 115 having a relatively low resolution, a bitrate may be significantly reduced, as compared with the case of performing the first encoding process 120 and the first decoding process 130 on the original image 105.

For example, referring to FIG. 1, according to an embodiment of the disclosure, in an AI encoding process, the first image 115 is obtained by performing the AI downscaling process 110 on the original image 105, and the first encoding process 120 is performed on the first image 115. In an AI decoding process, AI-encoding data including image data and AI data obtained as a result of the AI encoding process is received, a second image 135 is obtained through the first decoding process 130, and a third image 145 is obtained by performing an AI upscaling process 140 on the second image 135.

For example, in the AI encoding process, when the original image 105 is input, the AI downscaling process 110 is performed on the original image 105 so as to obtain the first image 115 having a certain resolution and/or a certain image quality. At this time, the AI downscaling process 110 is performed based on AI. The AI for the AI downscaling process 110 has to be joint-trained with the AI for the AI upscaling process 140 of the second image 135. This is because, when the AI for the AI downscaling process 110 and the AI for the AI upscaling process 140 are trained separately, the difference between the original image 105 to be AI encoded and the third image 145 reconstructed through the AI decoding process increases.

In an embodiment of the disclosure, the AI data may be used so as to maintain such a joint relationship between the AI encoding process and the AI decoding process. Therefore, the AI data obtained through the AI encoding process has to include information indicating an upscale target, and in the AI decoding process, the AI upscaling process 140 has to be performed on the second image 135 according to the upscale target identified based on the AI data.

The AI for the AI downscaling process 110 and the AI for the AI upscaling process 140 may be implemented as a neural network. As described below with reference to FIG. 11, because the first neural network and the second neural network are joint-trained through sharing of loss information under a certain target, an AI encoding apparatus may provide, to an AI decoding apparatus, target information used when the first neural network and the second neural network perform joint training, and the AI decoding apparatus may perform the AI upscaling process 140 to an image quality and/or a resolution targeting the second image 135 based on the provided target information.

For example, in the first encoding process 120 and the first decoding process 130 illustrated in FIG. 1, the amount of information of the first image 115 obtained by performing the AI downscaling process 110 on the original image 105 may be reduced through the first encoding process 120. The first encoding process 120 may include a process of generating predicted data by predicting the first image 115, a process of generating residual data corresponding to the difference between the first image 115 and the predicted data, a process of transforming the residual data, which is a spatial domain component, into a frequency domain component, a process of quantizing the residual data transformed into the frequency domain component, a process of entropy-encoding the quantized residual data, and the like. The first encoding process 120 may be implemented through one of image compression methods using frequency transformation, such as, for example, MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed through the first decoding process 130 of the image data. The first decoding process 130 may include a process of generating quantized residual data by performing entropy decoding on image data, a process of performing inverse quantization on the quantized residual data, a process of transforming residual data of a frequency domain component into a spatial domain component, a process of generating predicted data, a process of reconstructing the second image 135 by using the predicted data and the residual data, and the like. The first decoding process 130 may be implemented through one of the image compression methods using frequency transformation, which are used in the first encoding process 120.

The AI-encoding data obtained through the AI encoding process may include image data obtained as a result of the first encoding process 120 on the first image 115 and AI data related to the AI downscaling process 110 of the original image 105. The image data may be used in the first decoding process 130, and the AI data may be used in the AI upscaling process 140.

The image data may be transmitted in a bitstream form. The image data may include data obtained based on pixel values of the first image 115, for example, residual data that is the difference between the first image 115 and the predicted data of the first image 115. Also, the image data includes pieces of information used in the process of performing the first encoding process 120 on the first image 115. For example, the image data may include prediction mode information used to perform the first encoding process 120 on the first image 115, motion information, information related to quantization parameters used in the first encoding process 120, and the like. The image data may be generated in accordance with a rule (e.g., a syntax) of an image compression method used in the first encoding process 120 from among the image compression methods using frequency transformation, such as, for example, MPEG-2, H.264 AVC, MPEG-4, HEVC, VC-1, VP8, VP9, and AV1.

The AI data is used in the AI upscaling process 140 based on the second neural network. As described above, because the first neural network and the second neural network are joint-trained, the AI data includes information that enables the AI upscaling process 140 to be more accurately performed on the second image 135 through the second neural network. In the AI decoding process, the AI upscaling process 140 may be performed to a resolution and/or an image quality targeting the second image 135 based on the AI data.

The AI data may be transmitted together with the image data in a bitstream form. According to an implementation, the AI data may be transmitted separately from the image data in a frame or packet form. According to another embodiment, according to an implementation, the AI data may be transmitted by being included in the image data. The image data and the AI data may be transmitted via the same network or different networks.

Figure 2:
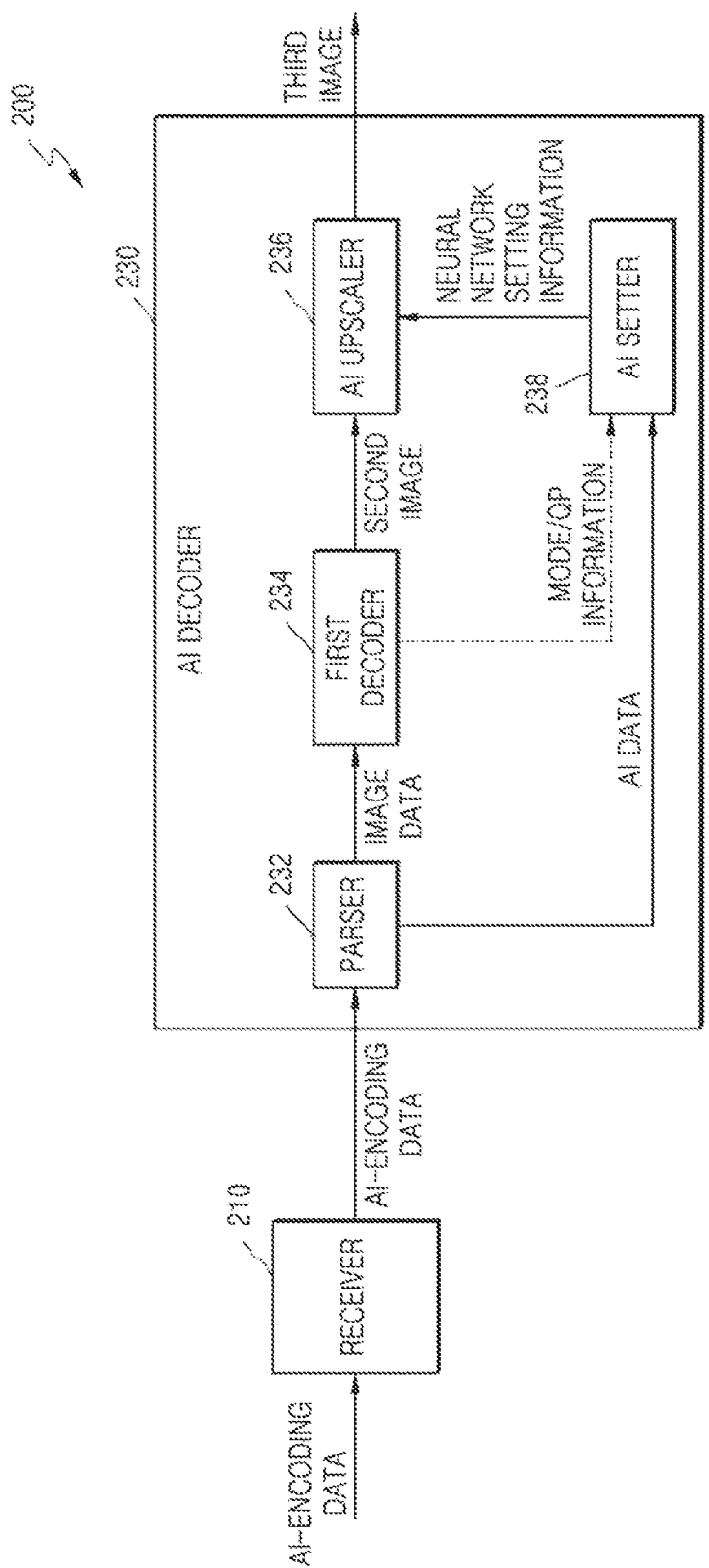
FIG. 2 is a block diagram illustrating a configuration of an AI decoder according to an embodiment of the disclosure.

FIG. 2 is a block diagram illustrating a configuration of an AI decoding apparatus 200, according to an embodiment of the disclosure.

Referring to FIG. 2, the AI decoding apparatus 200 according to an embodiment of the disclosure includes a receiver 210 and an AI decoder 230. The AI decoder 230 may include a parser 232, a first decoder 234, an AI upscaler 236, and an AI setter 238.

In FIG. 2, the receiver 210 and the AI decoder 230 are illustrated as separate devices, but the receiver 210 and the AI decoder 230 may be implemented through a single processor. In this case, the receiver 210 and the AI decoder 230 may be implemented as a dedicated processor, or may be implemented by a combination of software and a general-purpose processor such as an application processor (AP), a central processing unit (CPU), or a graphics processing unit (GPU). Also, in the case of a dedicated processor, the dedicated processor may include a memory for implementing the embodiment of the disclosure, or may include a memory processor for using an external memory.

The receiver 210 and the AI decoder 230 may include a plurality of processors. In this case, the receiver 210 and the AI decoder 230 may be implemented by a combination of dedicated processors, or may be implemented by a combination of software and a plurality of general-purpose processors such as an AP, a CPU, or a GPU. In an embodiment of the disclosure, the receiver 210 may be implemented as a first processor, the first decoder 234 may be implemented as a second processor that is different from the first processor, and the parser 232, the AI upscaler 236, and the AI setter 238 may be implemented as a third processor that is different from the first processor and the second processor.

The receiver 210 receives AI-encoding data obtained as a result of AI encoding. For example, the AI-encoding data may include a video file having a file format such as mp4 or mov.

The receiver 210 may receive AI-encoding data transmitted via a network. The receiver 210 outputs the AI-encoding data to the AI decoder 230.

In an embodiment of the disclosure, the AI-encoding data may be obtained from a data storage medium including a magnetic medium such as a hard disk, a floppy disk, and magnetic tape, an optical recording medium such as a compact disc read-only memory (CD-ROM) and a digital versatile disc (DVD), and a magneto-optical medium such as a floptical disk.

The parser 232 parses the AI-encoding data, transmits, to the first decoder 234, image data generated as a result of the first encoding process on the first image 115, and transmits AI data to the AI setter 238.

In an embodiment of the disclosure, the parser 232 may parse the image data and the AI data that are included in the AI-encoding data separately from each other. The parser 232 may read a header in the AI-encoding data and separate the AI data and the image data included in the AI-encoding data. In one example, the AI data may be included in a Vendor Specific InfoFrame (VSIF) of a high definition multimedia interface (HDMI) stream. The structure of the AI-encoding data including the AI data and the image data separated from each other will be described below with reference to FIG. 9.

In another embodiment of the disclosure, the parser 232 may parse the image data from the AI-encoding data, extract the AI data from the image data, transmit the AI data to the AI setter 238, and transmit the remaining image data to the first decoder 234. For example, the AI data may be included in the image data. For example, the AI data may be included in supplemental enhancement information (SEI), which is an additional information area of a bitstream corresponding to the image data. The structure of the AI-encoding data including the image data in which the AI data is included will be described below with reference to FIG. 10.

In another embodiment of the disclosure, the parser 232 may divide the bitstream corresponding to the image data into a bitstream to be processed by the first decoder 234 and a bitstream corresponding to the AI data, and output each divided bitstream to the first decoder 234 and the AI setter 238.

The parser 232 may confirm that the image data included in the AI-encoding data is image data obtained through a certain codec (e.g., MPEG-2, H.264, MPEG-4, HEVC, VC-1, VP8, VP9, or AV1). In this case, the corresponding information may be transmitted to the first decoder 234 so that the image data may be processed by the identified codec.

The first decoder 234 reconstructs the second image 135 corresponding to the first image 115, based on the image data received from the parser 232. The second image 135 obtained by the first decoder 234 is provided to the AI upscaler 236.

According to an implementation, first decoding-related information, such as prediction mode information, motion information, and quantization parameter information, may be provided from the first decoder 234 to the AI setter 238. The first decoding-related information may be used to obtain neural network setting information.

The AI data provided to the AI setter 238 includes pieces of information that enable the second image 135 to be AI-upscaled. In this case, an upscale target of the second image 135 has to correspond to a downscale target of the first neural network. Therefore, the AI data has to include information that enables the downscale target of the first neural network to be identified.

Specific examples of the information included in the AI data include difference information about the difference between the resolution of the original image 105 and the resolution of the first image 115 and information related to the first image 115.

The difference information may be expressed as information about the degree of resolution conversion of the first image 115 with respect to the original image 105 (e.g., resolution conversion rate information). Because the resolution of the first image 115 may be known through the resolution of the reconstructed second image 135 and the degree of resolution conversion may be confirmed therethrough, the difference information may be expressed only with resolution information of the original image 105. The resolution information may be expressed as a horizontal/vertical screen size, or may be expressed as a ratio (16:9, 4:3, etc.) and a size of one axis. Also, when there is preset resolution information, the difference information may be expressed in an index or flag form.

The information related to the first image 115 may include information about at least one of the resolution of the first image 115, the bitrate of the image data obtained as a result of the first encoding process on the first image 115, or the codec type used to perform the first encoding process on the first image 115.

The AI setter 238 may determine the upscale target of the second image 135 based on at least one of the difference information or the information related to the first image 115, which is included in the AI data. The upscale target may indicate, for example, to what resolution the second image 135 has to be upscaled.

When the upscale target is determined, the AI upscaler 236 performs an AI upscaling process on the second image 135 through the second neural network so as to obtain the third image 145 corresponding to the upscale target.

Prior to describing a method, performed by the AI setter 238, of determining an upscale target based on AI data, the AI upscaling process through the second neural network will be described with reference to FIGS. 3 and 4.

Figure 3:
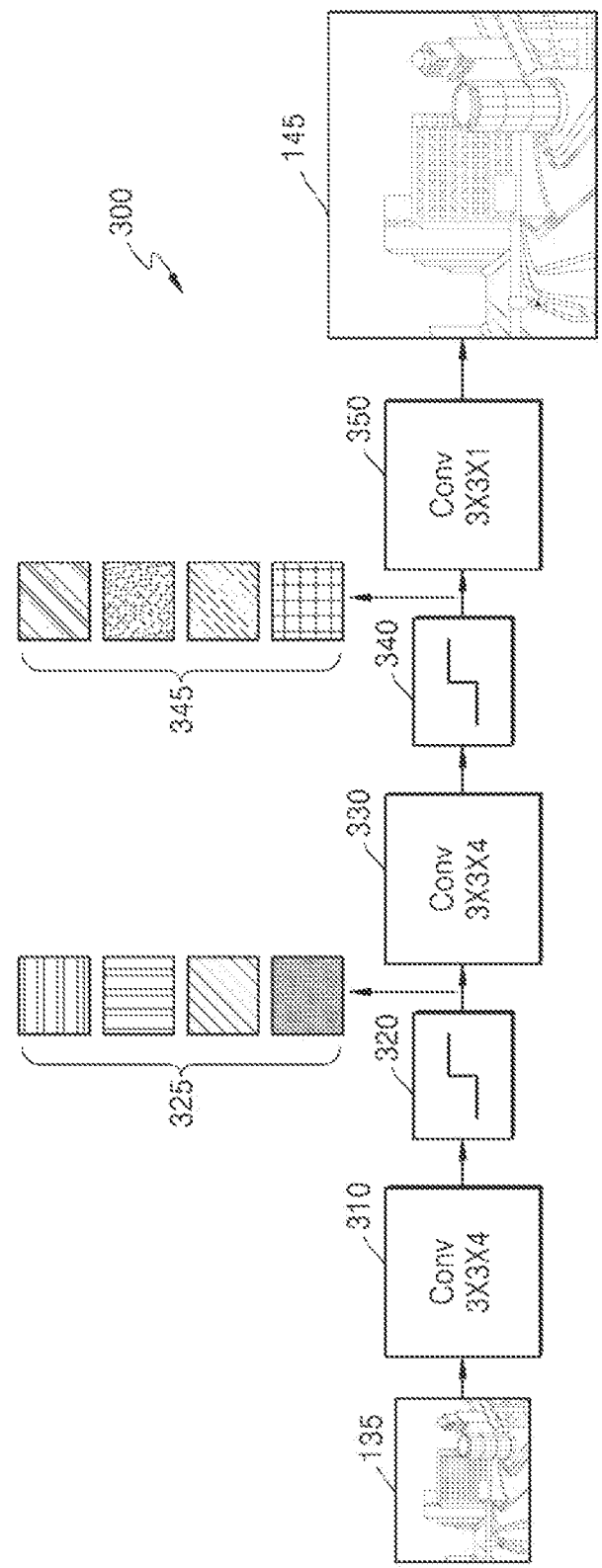
FIG. 3 is a diagram illustrating a second neural network for AI upscaling of a second image.
Figure 4:
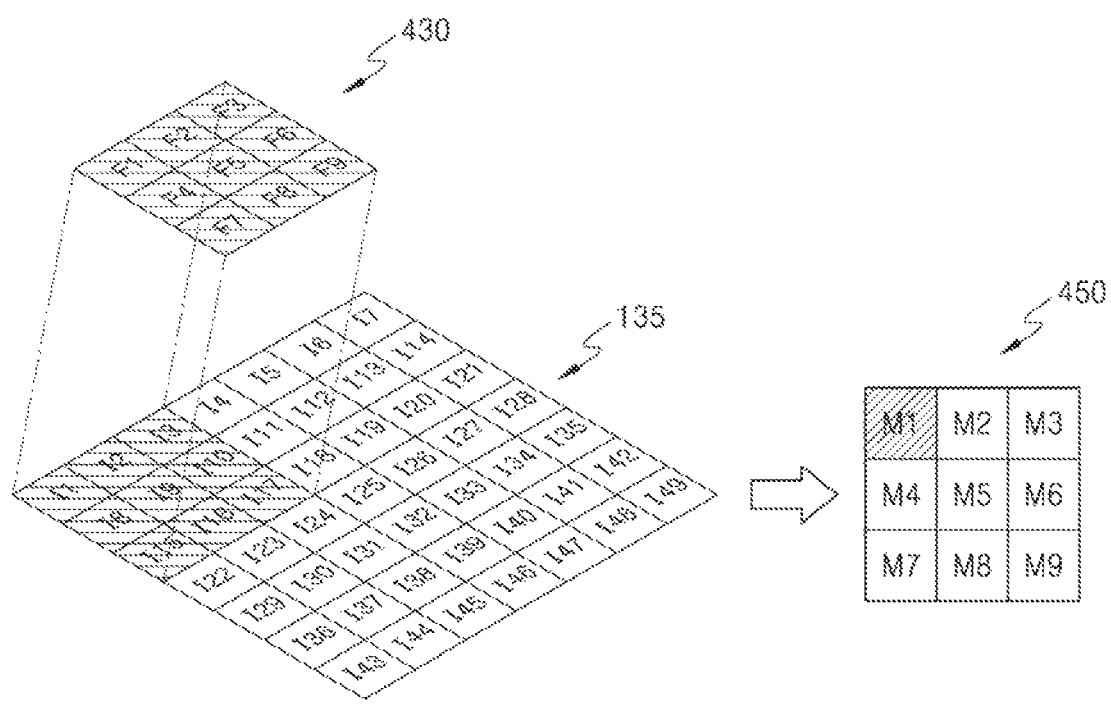
FIG. 4 is a diagram illustrating a convolution operation using a convolution layer.

FIG. 3 is a diagram illustrating a second neural network 300 for AI upscaling of a second image 135, and FIG. 4 illustrates a convolution operation in a first convolution layer 310 of FIG. 3.

As illustrated in FIG. 3, the second image 135 is input to the first convolution layer 310. 3×3×4 indicated in the first convolution layer 310 illustrated in FIG. 3 exemplifies a convolution process on one input image by using four filter kernels each having a 3×3 size. As a result of the convolution process, four feature maps are generated by the four filter kernels. The four feature maps represent unique characteristics of the second image 135. For example, the four feature maps may represent a vertical direction characteristic, a horizontal direction characteristic, or an edge characteristic of the second image 135.

Referring to FIG. 4, the convolution operation in the first convolution layer 310 will be described in detail.

One feature map 450 may be generated through a multiplication operation and an addition operation between the parameters of the filter kernel 430 having a 3×3 size used in the first convolution layer 310 and the pixel values of the second image 135 corresponding thereto. Because the four filter kernels are used in the first convolution layer 310, four feature maps may be generated through the convolution operation process using the four filter kernels.

In FIG. 4, I1 to I49 indicated in the second image 135 represent the pixels of the second image 135, and F1 to F9 indicated in the filter kernel 430 represent the parameters of the filter kernel 430. Also, M1 to M9 indicated in the feature map 450 represent samples of the feature map 450.

FIG. 4 illustrates that the second image 135 includes 49 pixels, but this is only an example. When the second image 135 has a 4K resolution, the second image 135 may include, for example, 3840×2160 pixels.

In the convolution operation process, the multiplication operation may be performed on the pixel values of the pixels I1, I2, I3, I8, I9, I10, I15, I16, and I17 of the second image 135 and the parameters F1, F2, F3, F4, F5, F6, F7, F8, and F9 of the filter kernel 430, and a value obtained by combining (e.g., by performing an addition operation on) the result values of the multiplication operation may be assigned as the value of the sample M1 of the feature map 450. When a stride of the convolution operation is 2, the multiplication operation may be performed on the pixel values of the pixels I3, I4, I5, I10, I11, I12, I17, I18, and I19 of the second image 135 and the parameters F1, F2, F3, F4, F5, F6, F7, F8, and F9 of the filter kernel 430, and a value obtained by combining the result values of the multiplication operation may be assigned as the value of the sample M2 of the feature map 450.

While the filter kernel 430 moves along the stride until reaching the last pixel of the second image 135, the convolution operation between the pixel values of the second image 135 and the parameters of the filter kernel 430 may be performed to obtain the feature map 450 having a certain size.

According to the disclosure, the values of the parameters of the second neural network, for example, the parameters of the filter kernel used in the convolution layers of the second neural network (e.g., F1, F2, F3, F4, F5, F6, F7, F8, and F9 of the filter kernel 430) may be optimized through the joint training of the first neural network and the second neural network. The AI setter 238 may determine the upscale target corresponding to the downscale target of the first neural network based on the AI data, and may determine the parameters corresponding to the determined upscale target as the parameters of the filter kernel used in the convolution layers of the second neural network.

The convolution layers included in the first neural network and the second neural network may perform the convolution operation process described with reference to FIG. 4, but the convolution operation process described with reference to FIG. 4 is only an example, and embodiments are not limited thereto.

Referring back to FIG. 3, the 1 from the first convolution layer 310 are input to a first activation layer 320.

The first activation layer 320 may impart non-linear characteristics to each feature map. The first activation layer 320 may include a sigmoid function, a Tanh function, a rectified linear unit (ReLU) function, and the like, but is not limited thereto.

Imparting the nonlinear characteristics in the first activation layer 320 indicates changing and outputting some sample values of the feature map, which is the output of the first convolution layer 310. At this time, the change is performed by applying the nonlinear characteristics.

The first activation layer 320 determines whether to transmit the sample values of the feature maps output from the first convolution layer 310 to a second convolution layer 330. For example, some sample values of the feature maps are activated by the first activation layer 320 and are transmitted to the second convolution layer 330, and some sample values of the feature maps are deactivated by the first activation layer 320 and are not transmitted to the second convolution layer 330. Unique characteristics of the second image 135 represented by the feature maps are emphasized by the first activation layer 320.

Feature maps 325 output from the first activation layer 320 are input to the second convolution layer 330. One of the feature maps 325 illustrated in FIG. 3 is a result of processing the feature map 450 described with reference to FIG. 4 in the first activation layer 320.

3×3×4 indicated in the second convolution layer 330 exemplifies a convolution process on the input feature maps 32 by using four 3×4 filter kernels each having a 3×3 size. The output of the second convolution layer 330 is input to the second activation layer 340. The second activation layer 340 may impart non-linear characteristics to the input data.

Feature maps 345 output from the second activation layer 340 are input to the third convolution layer 350. 3×3×1 indicated in the third convolution layer 350 illustrated in FIG. 3 exemplifies a convolution process for producing one output image by using one filter kernel having a 3×3 size. The third convolution layer 350 is a layer for outputting a final image and generates one output by using one filter kernel. According to an embodiment of the disclosure, the third convolution layer 350 may output the third image 145 through the convolution operation.

There may be a plurality of neural network setting information indicating the number of filter kernels of the first convolution layer 310, the second convolution layer 330, and the third convolution layer 350 of the second neural network 300, the parameters of the filter kernel, and the like, as described below, and the pieces of neural network setting information have to be joined with the pieces of neural network setting information of the first neural network. The correspondence relationship between the pieces of neural network setting information of the second neural network and the pieces of neural network setting information of the first neural network may be implemented through the joint training of the first neural network and the second neural network.

FIG. 3 illustrates that the second neural network 300 includes three convolution layers, for example, a first convolution layer 310, a second convolution layer 330, and a third convolution layer 350, and two activation layers, for example, a first activation layer 320 and a second activation layer 340, but embodiments are not limited thereto. According to an implementation, the number of convolution layers and the number of activation layers may be variously changed. Also, according to an implementation, the second neural network 300 may be implemented through a recurrent neural network (RNN). This case indicates changing a convolutional neural network (CNN) structure of the second neural network 300 according to the embodiment of the disclosure to an RNN structure.

In an embodiment of the disclosure, the AI upscaler 236 may include at least one arithmetic logic unit (ALU) for the convolution operation and the operation of the activation layer described above. The ALU may be implemented as a processor. For the convolution operation, the ALU may include a multiplier that performs a multiplication operation between the sample values of the feature map output from the second image 135 or the previous layer and the sample values of the filter kernel, and an adder that adds the result values of the multiplication operation. Also, for the operation of the activation layer, the ALU may include a multiplier that multiplies an input sample value by a weight used in a sigmoid function, a Tanh function, or an ReLU function, which is predetermined, and a comparator that compares a result of the multiplying to a certain value and determines whether to transfer the input sample value to the next layer.

Hereinafter, a method, performed by the AI setter 238, of determining the upscale target and a method, performed by the AI upscaler 236, of performing an AI upscaling process on the second image 135 according to the upscale target will be described.

In an embodiment of the disclosure, the AI setter 238 may store a plurality of neural network setting information that are settable in the second neural network.

The pieces of neural network setting information may include information about at least one of the number of convolution layers included in the second neural network, the number of filter kernels for each convolution layer, or the parameters of each filter kernel.

The pieces of neural network setting information may correspond to various upscale targets, respectively, and the second neural network may operate based on neural network setting information corresponding to a specific upscale target. The second neural network may have different structures from each other according to the neural network setting information. For example, the second neural network may include three convolution layers according to certain neural network setting information, and the second neural network may include four convolution layers according to other neural network setting information.

In an embodiment of the disclosure, the neural network setting information may include only parameters of the filter kernel used in the second neural network. In this case, the structure of the second neural network is not changed, but only the parameters of the internal filter kernel may be changed according to the neural network setting information.

The AI setter 238 may obtain neural network setting information for AI upscaling of the second image 135 from among the pieces of neural network setting information. Each of the pieces of neural network setting information used herein is information for obtaining the third image 145 having a predetermined resolution and/or a predetermined image quality and is joint-trained with the first neural network.

For example, one of the pieces of neural network setting information may include pieces of information for obtaining the third image 145 having a resolution that is twice higher than the second image 135, for example, the third image 145 having a 4K (4096*2160) resolution that is twice higher than the second image 135 of 2K (2048*1080) resolution, and another of the pieces of neural network setting information may include pieces of information for obtaining the third image 145 having a resolution that is four times higher than the second image 135, for example, the third image 145 having an 8K (8192*4320) resolution that is four times higher than the second image 135 of a 2K (2048*1080) resolution.

Each of the pieces of neural network setting information is generated in association with the neural network setting information of a first neural network of an AI encoding apparatus 700, and the AI setter 238 obtains one of the pieces of neural network setting information according to an enlargement ratio corresponding to a reduction ratio of the neural network setting information of the first neural network. To this end, the AI setter 238 has to check the information of the first neural network. In order for the AI setter 238 to check the information of the first neural network, the AI decoding apparatus 200 according to an embodiment of the disclosure receives AI data including the information of the first neural network from the AI encoding apparatus 700.

For example, the AI setter 238 may use the information received from the AI encoding apparatus 700 to check information targeted by the neural network setting information of the first neural network used to obtain the first image 115, and may obtain neural network setting information of the second neural network joint-trained therewith.

When the neural network setting information for AI upscaling of the second image 135 from among the pieces of neural network setting information is obtained, the neural network setting information may be transmitted to the AI upscaler 236, and input data may be processed based on the second neural network operating according to the neural network setting information.

For example, when any one of the pieces of the neural network setting information is obtained, the AI upscaler 236 may set the number of filter kernels and the parameters of the filter kernel as a value included in the obtained neural network setting information with respect to each of the first convolution layer 310, the second convolution layer 330, and the third convolution layer 350 of the second neural network 300 illustrated in FIG. 3.

For example, when the parameters of the 3×3 filter kernel 430 illustrated in FIG. 4 are {1, 1, 1, 1, 1, 1, 1, 1, 1} and neural network setting information is changed, the AI upscaler 236 may replace the parameters of the filter kernel with {2, 2, 2, 2, 2, 2, 2, 2, 2}, which are parameters included in the changed neural network setting information.

The AI setter 238 may obtain neural network setting information for upscaling the second image 135 from among the pieces of neural network setting information, based on the information included in the AI data, and the AI data used to obtain the neural network setting information will be described in detail.

In an embodiment of the disclosure, the AI setter 238 may obtain neural network setting information for upscaling the second image 135 from among the pieces of neural network setting information, based on difference information included in the AI data. For example, when it is determined that the resolution (e.g., 4K (4096×2160)) of the original image 105 is twice the resolution (e.g., 2K (2048×1080)) of the first image 115, based on the difference information, the AI setter 238 may obtain neural network setting information capable of doubling the resolution of the second image 135.

In another embodiment of the disclosure, the AI setter 238 may obtain neural network setting information for AI upscaling the second image 135 from among the pieces of neural network setting information, based on the information related to the first image 115, which is included in the AI data. The AI setter 238 may predetermine a mapping relationship between image-related information and neural network setting information, and may obtain neural network setting information mapped to the information related to the first image 115.

FIG. 5 is a diagram illustrating a mapping relationship between various pieces of image-related information and various pieces of neural network setting information;

It may be seen from FIG. 5 that the AI encoding/AI decoding process according to an embodiment of the disclosure is not based on only a change in resolution. As illustrated in FIG. 5, neural network setting information may be selected based on, individually or collectively, the resolution such as SD, HD, or Full HD, the bitrate such as 10 Mbps, 15 Mbps, or 20 Mbps, and the codec information such as AV1, H.264, or HEVC. For this consideration, training based on each factor in the AI training process has to be performed in connection with the encoding and decoding process (see FIG. 11).

Therefore, as illustrated in FIG. 5, according to the training content, when a plurality of neural network setting information are provided based on image-related information including a codec type and an image resolution, neural network setting information for AI-upscaling the second image 135 may be obtained based on information related to the first image 115 received during the AI decoding process.

For example, because the AI setter 238 matches the image-related information shown on the left side of the table illustrated in FIG. 5 with the neural network setting information shown on the right side of the table, the neural network setting information according to the image-related information may be used.

As illustrated in FIG. 5, when it is confirmed from the information related to the first image 115 that the resolution of the first image 115 is SD, the bitrate of the image data obtained as a result of the first encoding process on the first image 115 is 10 Mbps, and the first image 115 is first-encoded with the AV1 codec, the AI setter 238 may obtain "A" neural network setting information from among the pieces of neural network setting information.

Also, when it is confirmed from the information related to the first image 115 that the resolution of the first image 115 is HD, the bitrate of the image data obtained as a result of the first encoding process is 15 Mbps, and the first image 115 is first-encoded with the H.264 codec, the AI setter 238 may obtain "B" neural network setting information from among the pieces of neural network setting information.

Also, when it is confirmed from the information related to the first image 115 that the resolution of the first image 115 is Full HD, the bitrate of the image data obtained as a result of the first encoding on the first image 115 is 20 Mbps, and the first image 115 is first-encoded with the HEVC codec, the AI setter 238 may obtain "C" neural network setting information from among the pieces of neural network setting information. When it is confirmed that the resolution of the first image 115 is Full HD, the bitrate of the image data obtained as a result of the first encoding process on the first image 115 is 15 Mbps, and the first image 115 is first-encoded with the HEVC codec, the AI setter 238 may obtain "D" neural network setting information from among the pieces of neural network setting information. One of the "C" neural network setting information and the "D" neural network setting information is selected according to whether the bitrate of the image data obtained as a result of the first encoding process on the first image 115 is 20 Mbps or 15 Mbps. The bitrates of the image data being different from each other when the first images 115 having the same resolution are first-encoded with the same codec indicates that the image qualities of the reconstructed images are different from each other. Therefore, the first neural network and the second neural network may be joint-trained based on a certain image quality, and accordingly, the AI setter 238 may obtain neural network setting information according to the bitrate of the image data indicating the image quality of the second image 135.

In another embodiment of the disclosure, the AI setter 238 may obtain neural network setting information for AI-upscaling the second image 135 from among the pieces of neural network setting information, based on both the information provided from the first decoder 234 (prediction mode information, motion information, quantization parameter information, etc.) and the information related to the first image 115 included in the AI data. For example, the AI setter 238 may receive, from the first decoder 234, quantization parameter information used to perform the first encoding process on the first image 115, may confirm the bitrate of the image data obtained as a result of encoding the first image 115 from the AI data, and may obtain neural network setting information corresponding to the quantization parameter and the bitrate. Even with the same bitrate, the degree of image quality of the reconstructed image may be different according to the complexity of the image. The bitrate is a value entirely representing the first image 115 to be first-encoded, and the image quality of each frame may be different even within the first image 115. Therefore, when based on the prediction mode information, the motion information, and/or quantization parameter together, which may be obtained from the first decoder 234 for each frame, neural network setting information that is more suitable for the second image 135 may be obtained, as compared with the case in which only the AI data is used.

Also, according to an implementation, the AI data may include an identifier of prearranged neural network setting information. The identifier of the neural network setting information is the upscale target corresponding to the downscale target of the first neural network and is information for discriminating a pair of pieces of neural network setting information joint-trained between the first neural network and the second neural network so that the AI upscaling of the second image 135 is enabled. The AI setter 238 may obtain the identifier of the neural network setting information included in the AI data and then obtain the neural network setting information corresponding to the identifier of the neural network setting information, and the AI upscaler 236 may perform an AI upscaling process on the second image 135 by using the corresponding neural network setting information. For example, an identifier indicating each of a plurality of neural network setting information settable in the first neural network and an identifier indicating each of a plurality of neural network setting information settable in the second neural network may be pre-designated. In this case, the same identifier may be designated for a pair of pieces of neural network setting information that are settable in each of the first neural network and the second neural network. The AI data may include an identifier of neural network setting information set in the first neural network for AI-downscaling the original image 105. The AI setter 238 having received the AI data may obtain neural network setting information indicated by the identifier included in the AI data from among the pieces of neural network setting information, and the AI upscaler 236 may perform an AI upscaling process on the second image 135 by using the corresponding neural network setting information.

In addition, according to an implementation, the AI data may include neural network setting information. The AI setter 238 may obtain the neural network setting information included in the AI data, and the AI upscaler 236 may perform an AI upscaling process on the second image 135 by using the corresponding neural network setting information.

According to an implementation, when pieces of information constituting the neural network setting information (e.g., the number of convolution layers, the number of filter kernels for each convolution layer, the parameters of each filter kernel, etc.) are stored in the form of a lookup table, the AI setter 238 may obtain neural network setting information by combining some values selected from among values of the lookup table based on the information included in the AI data, and the AI upscaler 236 may perform an AI upscaling process on the second image 135 by using the corresponding neural network setting information.

According to an implementation, when the structure of the neural network corresponding to the upscale target is determined, the AI setter 238 may obtain neural network setting information corresponding to the determined structure of the neural network, for example, parameters of the filter kernel.

As described above, the AI setter 238 obtains the neural network setting information of the second neural network through the AI data including information related to the first neural network, and the AI upscaler 236 may perform an AI upscaling process on the second image 135 through the second neural network set with the corresponding neural network setting information. This may reduce the amount of memory usage and the amount of computations, as compared with the case in which upscaling is performed by directly analyzing the features of the second image 135.

In an embodiment of the disclosure, when the second image 135 includes a plurality of frames, the AI setter 238 may independently obtain neural network setting information for each certain number of frames, or may obtain common neural network setting information for all frames.

Figure 6:
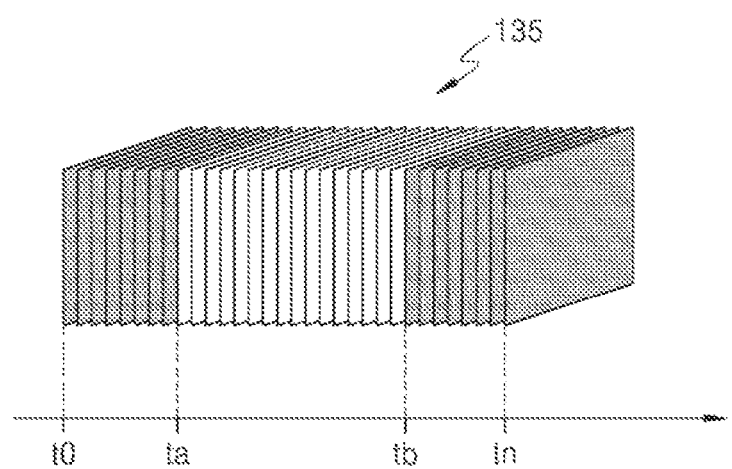
FIG. 6 is a diagram illustrating a second image including a plurality of frames.

FIG. 6 is a diagram illustrating a second image 135 including a plurality of frames.

As illustrated in FIG. 6, the second image 135 may include frames corresponding to t0 to tn.

In one example, the AI setter 238 may obtain neural network setting information of the second neural network through AI data, and the AI upscaler 236 may perform an AI upscaling process on the frames corresponding to t0 to tn based on the corresponding neural network setting information. For example, the AI upscaling process may be performed on the frames corresponding to t0 to tn based on the common neural network setting information.

In another example, the AI setter 238 may obtain "A" neural network setting information from AI data for some of the frames corresponding to t0 to tn, for example, frames corresponding to t0 to ta, and may obtain "B" neural network setting information from AI data for frames corresponding to ta+1 to tb. Also, the AI setter 238 may obtain "C" neural network setting information from AI data for frames corresponding to tb+1 to tn. For example, the AI setter 238 may independently obtain neural network setting information for each group including a certain number of frames from among a plurality of frames, and the AI upscaler 236 may perform an AI upscaling process on the frames included in each group by using the independently obtained neural network setting information.

In another example, the AI setter 238 may independently obtain neural network setting information for each frame constituting the second image 135. For example, when the second image 135 includes three frames, the AI setter 238 may obtain neural network setting information in relation to a first frame, obtain neural network setting information in relation to a second frame, and obtain neural network setting information in relation to a third frame. For example, the neural network setting information may be independently obtained for each of the first frame, the second frame, and the third frame. According to the method of obtaining the neural network setting information based on the information provided from the first decoder 234 (prediction mode information, motion information, quantization parameter information, etc.) and the information related to the first image 115 included in the AI data, neural network setting information may be independently obtained for each frame constituting the second image 135. This is because mode information, quantization parameter information, etc. may be independently determined for each frame constituting the second image 135.

In another example, the AI data may include information indicating up to which frame the neural network setting information obtained based on the AI data is valid. For example, when the AI data includes information indicating that neural network setting information is valid up to the frame corresponding to ta, the AI setter 238 obtains neural network setting information based on the AI data, and the AI upscaler 236 performs an AI upscaling process on the frames corresponding to t0 to ta by using the corresponding neural network setting information. When another AI data includes information indicating that neural network setting information is valid up to the frame corresponding to tn, the AI setter 238 may obtain neural network setting information based on the other AI data, and the AI upscaler 236 may perform an AI upscaling process on the frames corresponding to ta+1 to tn by using the obtained neural network setting information.

Hereinafter, an AI encoding apparatus 700 for AI encoding an original image 105 will be described with reference to FIG. 7.

Figure 7:
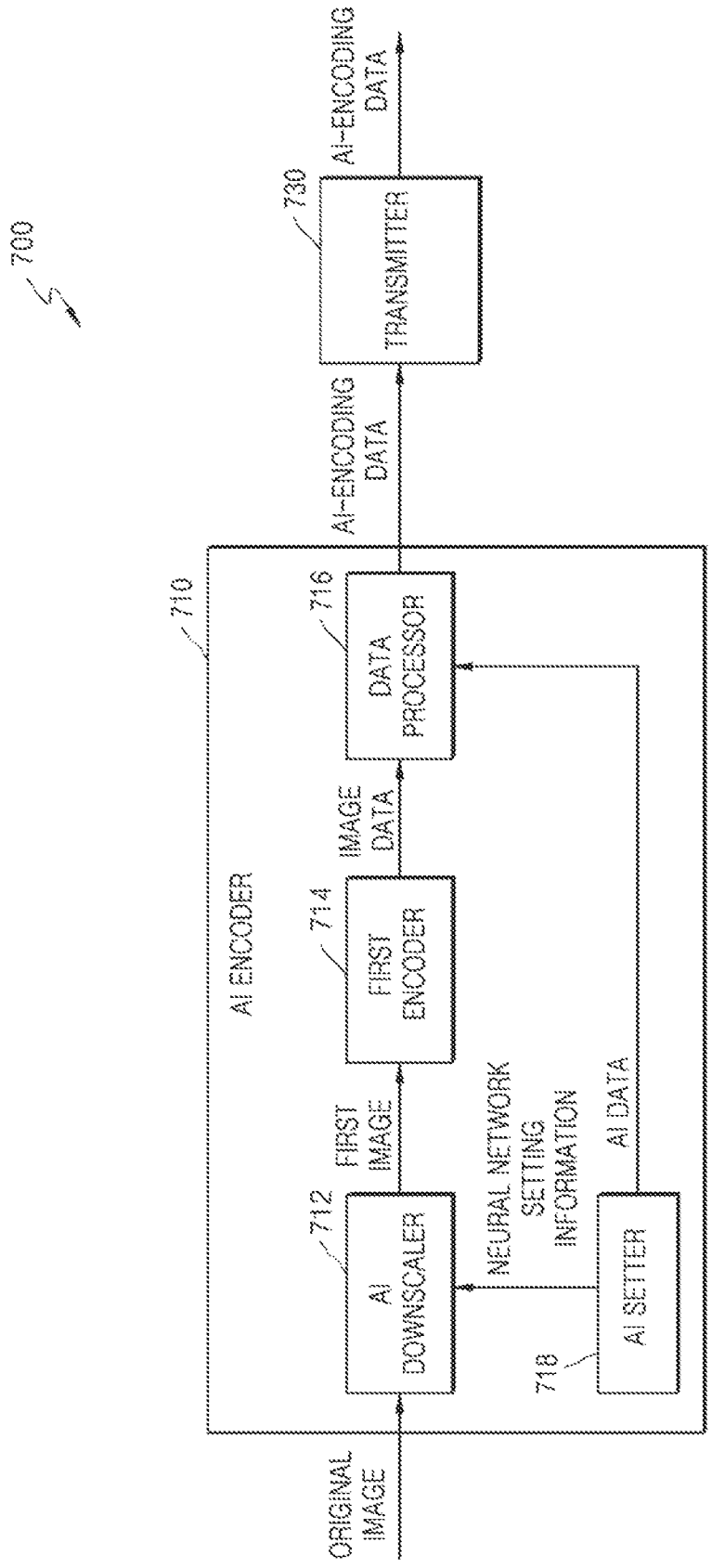
FIG. 7 is a block diagram illustrating a configuration of an AI encoder according to an embodiment of the disclosure.

FIG. 7 is a block diagram illustrating the configuration of the AI encoding apparatus 700, according to an embodiment of the disclosure.

Referring to FIG. 7, the AI encoding apparatus 700 may include an AI encoder 710 and a transmitter 730. The AI encoder 710 may include an AI downscaler 712, a first encoder 714, a data processor 716, and an AI setter 718.

In FIG. 7, the AI encoder 710 and the transmitter 730 are illustrated as separate devices, but the AI encoder 710 and the transmitter 730 may be implemented through a single processor. In this case, the AI encoder 710 and the transmitter 730 may be implemented by a combination of dedicated processors, or may be implemented by a combination of software and a general-purpose processor such as an AP, a CPU, or a GPU. Also, in the case of a dedicated processor, the dedicated processor may include a memory for implementing the embodiment of the disclosure, or may include a memory processor for using an external memory.

Also, the AI encoder 710 and the transmitter 730 may include a plurality of processors. In this case, the receiver 210 and the AI decoder 230 may be implemented by a combination of dedicated processors, or may be implemented by a combination of software and a plurality of general-purpose processors such as an AP, a CPU, or a GPU. In an embodiment of the disclosure, the first encoder 714 may be implemented as a first processor, the AI downscaler 712, the data processor 716, and the AI setter 718 may be implemented as a second processor that is different from the first processor, and the transmitter 730 may be implemented as a third processor that is different from the first processor and the second processor.

The AI encoder 710 performs an AI downscaling process on the original image 105 and a first encoding process on the first image 115 and transmits AI-encoding data to the transmitter 730. The transmitter 730 transmits the AI-encoding data to the AI decoding apparatus 200.

Image data includes data obtained as a result of the first encoding process on the first image 115. The image data may include data obtained based on pixel values of the first image 115, for example, residual data that is the difference between the first image 115 and the predicted data of the first image 115. Also, the image data includes pieces of information used in the process of performing the first encoding process on the first image 115. For example, the image data may include prediction mode information used to perform the first encoding process on the first image 115, motion information, information related to quantization parameters used to perform the first encoding process on the first image 115, and the like.

AI data includes information that enables the AI upscaler 236 to perform an AI upscaling process on the second image 135 as the upscale target corresponding to the downscale target of the first neural network.

In one example, the AI data may include difference information between the original image 105 and the first image 115.

In one example, the AI data may include information related to the first image 115. The information related to the first image 115 may include information about at least one of the resolution of the first image 115, the bitrate of the image data obtained as a result of the first encoding process on the first image 115, or the codec type used to perform the first encoding process on the first image 115.

In an embodiment of the disclosure, the AI data may include an identifier of prearranged neural network setting information so that the AI upscaling process is performed on the second image 135 as the upscale target corresponding to the downscale target of the first neural network.

Also, in an embodiment of the disclosure, the AI data may include neural network setting information settable in the second neural network.

The AI downscaler 712 may obtain the first image 115 AI-downscaled from the original image 105 through the first neural network. The AI downscaler 712 may AI-downscale the original image 105 by using the neural network setting information provided from the AI setter 718.

The AI setter 718 may determine the downscale target of the original image 105 based on a predetermined criterion.

In order to obtain the first image 115 matching the downscale target, the AI setter 718 may store a plurality of neural network setting information that are settable in the first neural network. The AI setter 718 obtains neural network setting information corresponding to the downscale target from among the pieces of neural network setting information, and provides the obtained neural network setting information to the AI downscaler 712.

The pieces of neural network setting information may be those trained so as to obtain the first image 115 having a predetermined resolution and/or a predetermined image quality. For example, one of the pieces of neural network setting information may include pieces of information for obtaining the first image 115 having a resolution that is ½ times lower than the original image 105, for example, the first image 115 having a resolution of 2K (2048*1080) that is ½ times lower than the original image 105 having a resolution of 4K (4096*2160), and another of the pieces of neural network setting information may include pieces of information for obtaining the first image 115 having a resolution that is ¼ times lower than the original image 105, for example, the first image 115 having a resolution of 2K (2048*1080) that is ¼ times lower than the original image 105 having a resolution of 8K (8192*4320).

According to an implementation, when pieces of information constituting the neural network setting information (e.g., the number of convolution layers, the number of filter kernels for each convolution layer, the parameters of each filter kernel, etc.) are stored in the form of a lookup table, the AI setter 718 may obtain neural network setting information by combining some values selected from among values of the lookup table according to the downscale target, and provide the obtained neural network setting information to the AI downscaler 712.

According to an implementation, the AI setter 718 may determine the structure of the neural network corresponding to the downscale target and obtain neural network setting information corresponding to the determined structure of the neural network, for example, parameters of the filter kernel.

The pieces of neural network setting information for AI-downscaling the original image 105 may have an optimized value by joint training of the first neural network and the second neural network. Each of the pieces of neural network setting information may include at least one of the number of convolution layers included in the first neural network, the number of filter kernels for each convolution layer, or the parameters of each filter kernel.

The AI downscaler 712 may set the first neural network with neural network setting information determined for AI-downscaling the original image 105, and obtain the first image 115 having a certain resolution and/or a certain image quality through the first neural network. When the neural network setting information for AI downscaling the original image 105 is obtained from among the pieces of neural network setting information, each layer in the first neural network may process input data based on pieces of information included in the neural network setting information.

Hereinafter, a method, performed by the AI setter 718, of determining a downscale target will be described. The downscale target may indicate, for example, how much the first image 115 with a reduced resolution has to be obtained from the original image 105.

The AI setter 718 obtains one or more pieces of input information. In an embodiment of the disclosure, the input information may include at least one of a target resolution of the first image 115, a target bitrate of the image data, a bitrate type of the image data (e.g., a variable bitrate type, a constant bitrate type, an average bitrate type, etc.), a color format to which the AI downscaling is applied (a luma component, a chroma component, a red component, a green component, or a blue component, etc.), a codec type for performing the first encoding process on the first image 115, compression history information, a resolution of the original image 105, or a type of the original image 105.

One or more pieces of input information may be stored in advance in the AI encoding apparatus 700, or may include information input from a user.

The AI setter 718 controls the operation of the AI downscaler 712 based on the input information. In an embodiment of the disclosure, the AI setter 718 may determine the downscale target according to the input information, and may provide, to the AI downscaler 712, neural network setting information corresponding to the determined downscale target.

In an embodiment of the disclosure, the AI setter 718 may transmit at least a part of the input information to the first encoder 714, so that the first encoder 714 may perform a first encoding process on the first image 115 with a bitrate of a specific value, a bitrate of a specific type, and a specific codec.

In an embodiment of the disclosure, the AI setter 718 may determine the downscale target based on at least one of a compression rate (e.g., a difference in resolution between the original image 105 and the first image 115, a target bitrate, etc.), a compression quality (e.g., a bitrate type), compression history information, or a type of the original image 105.

In one example, the AI setter 718 may determine the downscale target based on a compression rate or a compression quality, which is preset or is input from a user.

As another example, the AI setter 718 may determine the downscale target by using compression history information stored in the AI encoding apparatus 700. For example, the coding quality or compression rate that the user prefers may be determined according to the compression history information that may be used by the AI encoding apparatus 700, and the downscale target may be determined according to the coding quality determined based on the compression history information. For example, the resolution, image quality, etc. of the first image 115 may be determined according to the coding quality that has been used most frequently, based on the compression history information.

As another example, the AI setter 718 may also determine the downscale target based on the coding quality that has been used more frequently than a certain threshold value, based on the compression history information (e.g., an average quality of coding qualities that have been used more frequently than the certain threshold value).

As another example, the AI setter 718 may determine the downscale target based on the resolution, type (e.g., file format), etc. of the original image 105.

In an embodiment of the disclosure, when the original image 105 includes a plurality of frames, the AI setter 718 may independently obtain neural network setting information for each of a certain number of frames, and may provide the independently obtained neural network setting information to the AI downscaler 712.

In an example, the AI setter 718 may divide the frames constituting the original image 105 into a certain number of groups, and may independently obtain neural network setting information for each group. The same or different neural network setting information may be obtained for each group. The number of frames included in the groups may be equal or different for each group.

In another example, the AI setter 718 may independently determine neural network setting information for each frame constituting the original image 105. The same or different neural network setting information may be obtained for each frame.

Hereinafter, an exemplary structure of a first neural network 800 that is the basis of AI downscaling will be described.

Figure 8:
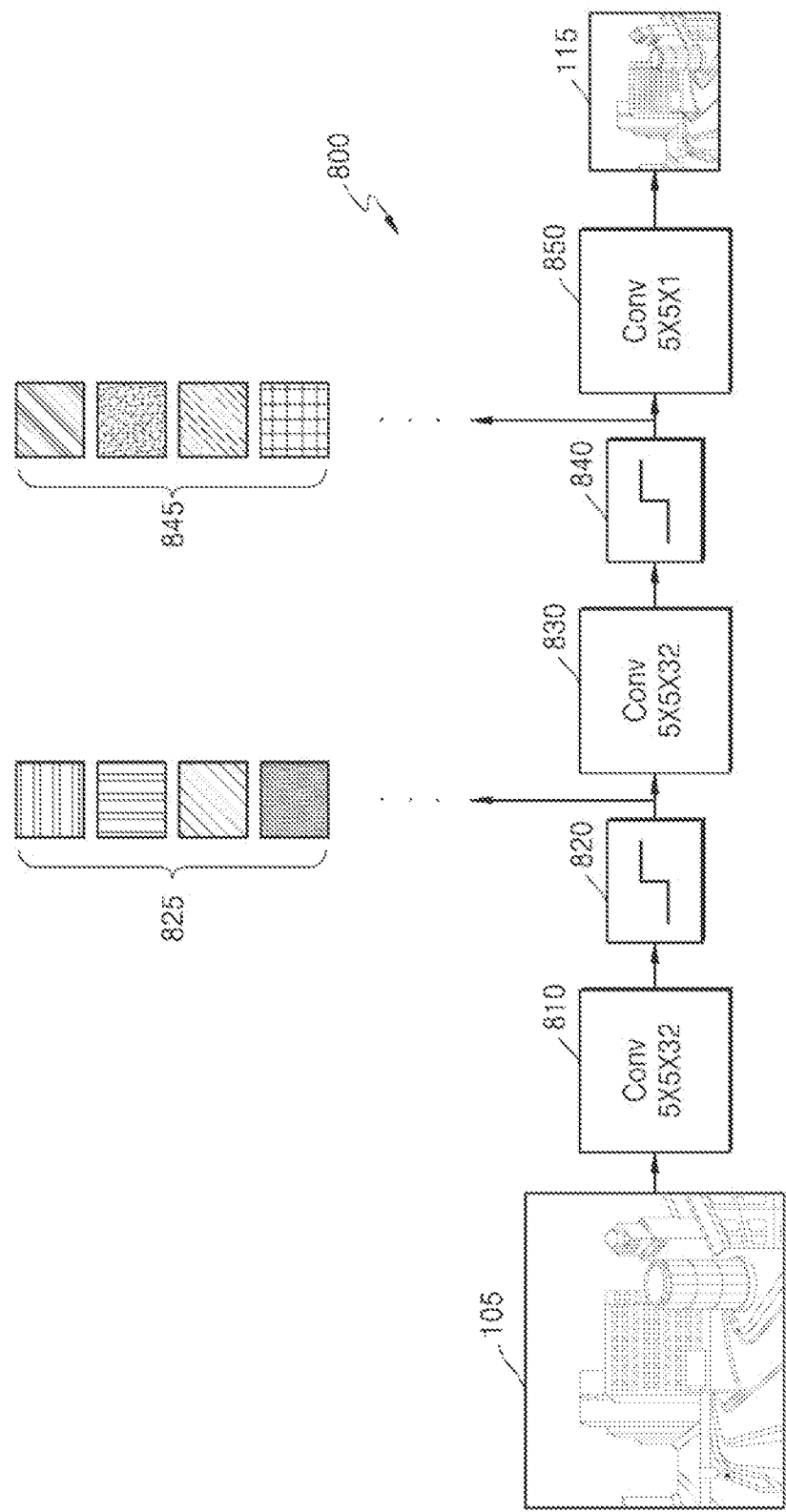
FIG. 8 is a diagram illustrating a first neural network for AI downscaling of an original image.

FIG. 8 is a diagram illustrating the first neural network 800 for AI-downscaling an original image 105.

As illustrated in FIG. 8, the original image 105 is input to a first convolution layer 810. The first convolution layer 810 performs a convolution process on the original image 105 by using 32 filter kernels each having a 5×5 size. 32 feature maps generated as a result of the convolution process are input to a first activation layer 820.

The first activation layer 820 may impart non-linear characteristics to the 32 feature maps.

The first activation layer 820 determines whether to transmit the sample values of the feature maps output from the first convolution layer 810 to a second convolution layer 830. For example, some sample values of the feature maps are activated by the first activation layer 820 and are transmitted to the second convolution layer 830, and some sample values of the feature maps are deactivated by the first activation layer 820 and are not transmitted to the second convolution layer 830. Information indicated by the feature maps output from the first convolution layer 810 is emphasized by the first activation layer 820.

An output 825 of the first activation layer 820 is input to the second convolution layer 830. The second convolution layer 830 performs a convolution process on input data by using 32 filter kernels each having a 5×5 size. The 32 feature maps output as a result of the convolution process may be input to the second activation layer 840, and the second activation layer 840 may impart non-linear characteristics to the 32 feature maps.

An output 845 of the second activation layer 840 is input to a third convolution layer 850. The third convolution layer 850 performs a convolution process on input data by using one filter kernel having a 5×5 size. As a result of the convolution process, one image may be output from the third convolution layer 850. The third convolution layer 850 is a layer for outputting a final image and obtains one output by using one filter kernel. According to an embodiment of the disclosure, the third convolution layer 850 may output the first image 115 through a result of the convolution operation.

There may be a plurality of neural network setting information indicating the number of filter kernels of the first convolution layer 810, the second convolution layer 830, and the third convolution layer 850 of the first neural network 800, the parameters of the filter kernel, and the like, and the pieces of neural network setting information have to be joined with the pieces of neural network setting information of the first neural network. The correspondence relationship between the pieces of neural network setting information of the first neural network and the pieces of neural network setting information of the second neural network may be implemented through the joint training of the first neural network and the second neural network.

FIG. 8 illustrates that the first neural network 800 includes three convolution layers, for example, a first convolution layer 810, a second convolution layer 830, and a third convolution layer 850 and two activation layers, for example, a first convolution layer 820 and a second convolution layer 840, but this is only an example. According to an implementation, the number of convolution layers and the number of activation layers may be variously changed. Also, according to an implementation, the first neural network 800 may be implemented through an RNN. This case indicates changing a CNN structure of the first neural network 800 according to the embodiment of the disclosure to an RNN structure.

In an embodiment of the disclosure, the AI downscaler 712 may include at least one ALU for the convolution operation and the operation of the activation layer. The ALU may be implemented as a processor. For the convolution operation, the ALU may include a multiplier that performs a multiplication operation between the sample values of the feature map output from the original image 105 or the previous layer and the sample values of the filter kernel, and an adder that adds the result values of the multiplication operation. Also, for the operation of the activation layer, the ALU may include a multiplier that multiplies an input sample value by a weight used in a sigmoid function, a Tanh function, or an ReLU function, which is predetermined, and a comparator that compares a result of the multiplying to a certain value and determines whether to transfer the input sample value to the next layer.

Referring back to FIG. 7, the AI setter 718 transmits the AI data to the data processor 716. AI data includes information that enables the AI upscaler 236 to perform an AI upscaling process on the second image 135 as the upscale target corresponding to the downscale target of the first neural network.

The first encoder 714, which receives the first image 115 from the AI downscaler 712, may reduce the amount of information included in the first image 115 by performing a first encoding process on the first image 115 in accordance with a frequency transformation-based image compression method. Image data is obtained as a result of the first encoding process through a certain codec (e.g., MPEG-2, H.264, MPEG-4, HEVC, VC-1, VP8, VP9, or AV1). The image data is obtained according to a rule of a certain codec, for example, a syntax. For example, the image data may include residual data, which is the difference between the first image 115 and predicted data of the first image 115, prediction mode information used to perform the first encoding process on the first image 115, motion information, and information related to quantization parameters used to perform the first encoding process on the first image 115.

The image data obtained as a result of the first encoding process performed by the first encoder 714 is provided to the data processor 716.

The data processor 716 generates AI-encoding data including the image data received from the first encoder 714 and the AI data received from the AI setter 718.

In an embodiment of the disclosure, the data processor 716 may generate the AI-encoding data including the image data and the AI data in separate states. For example, the AI data may be included in a VSIF of an HDMI stream.

In another embodiment of the disclosure, the data processor 716 may include the AI data in the image data obtained as a result of the first encoding process performed by the first encoder 714, and may generate the AI-encoding data including the corresponding image data. For example, the data processor 716 may generate image data in the form of one bitstream by combining a bitstream corresponding to the image data and a bitstream corresponding to the AI data. To this end, the data processor 716 may express the AI data as bits having a value of 0 or 1, that is, a bitstream. In an embodiment of the disclosure, the data processor 716 may include a bitstream corresponding to the AI data in SEI, which is an additional information area of the bitstream obtained as a result of the first encoding process.

The AI-encoding data is transmitted to the transmitter 730. The transmitter 730 transmits the AI-encoding data obtained as a result of the AI encoding via a network.

In an embodiment of the disclosure, the AI-encoding data may be stored in a data storage medium including a magnetic medium such as a hard disk, a floppy disk, and magnetic tape, an optical recording medium such as a CD-ROM and a DVD, and a magneto-optical medium such as a floptical disk.

Figure 9:
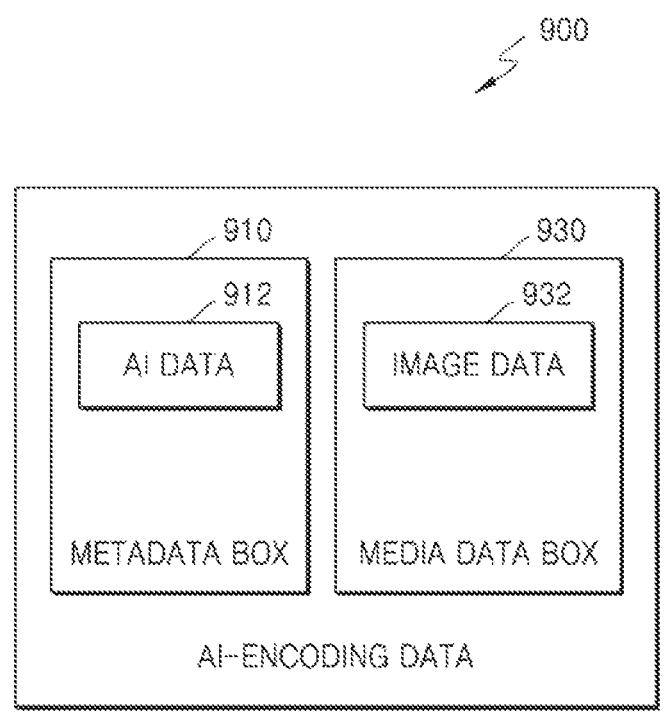
FIG. 9 is a diagram illustrating a structure of AI-encoding data according to an embodiment of the disclosure.

FIG. 9 is a diagram illustrating a structure of AI-encoding data 900, according to an embodiment of the disclosure.

As described above, AI data 912 and image data 932 may be separately included in the AI-encoding data 900. The AI-encoding data 900 may have a container format such as MP4, AVI, MKV, or FLV. The AI-encoding data 900 may include a metadata box 910 and a media data box 930.

The metadata box 910 includes information about the image data 932 included in the media data box 930. For example, the metadata box 910 may include information about a type of the first image 115, a type of codec used to encode the first image 115, and a reproduction time of the first image 115. Also, the AI data 912 may be included in the metadata box 910. The AI data 912 may be encoded according to an encoding method provided in a certain container format, and may be stored in the metadata box 910.

The media data box 930 may include the image data 932 generated according to a syntax of a certain image compression method.

Figure 10:
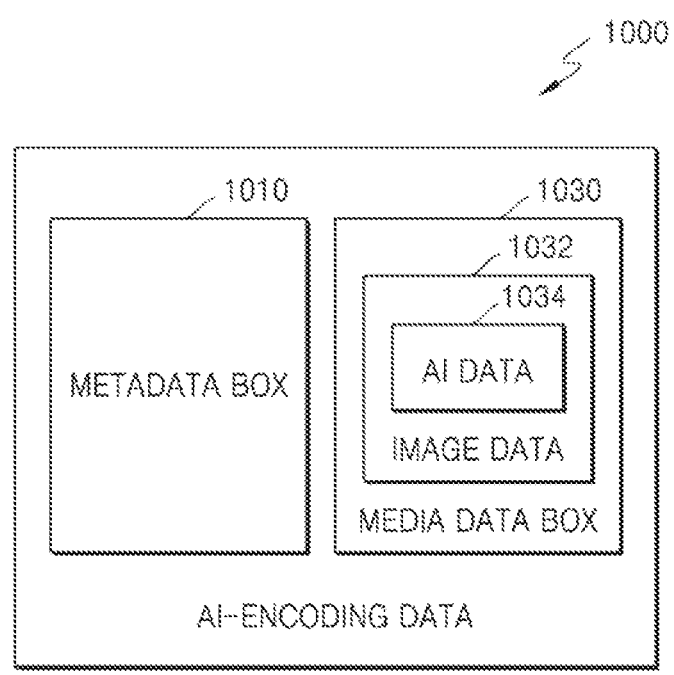
FIG. 10 is a diagram illustrating a structure of AI-encoding data according to another embodiment of the disclosure.

FIG. 10 is a diagram illustrating a structure of AI-encoding data 1000, according to another embodiment of the disclosure.

Referring to FIG. 10, AI data 1034 may be included in image data 1032. The AI-encoding data 1000 may include a metadata box 1010 and a media data box 1030. When the AI data 1034 is included in the image data 1032, the AI data 1034 may not be included in the metadata box 1010.

The media data box 1030 includes the image data 1032 including the AI data 1034. For example, the AI data 1034 may be included in an additional information area of the image data 1032.

Hereinafter, referring to FIG. 11, a method of joint-training a first neural network 800 and a second neural network 300 will be described.

Figure 11:
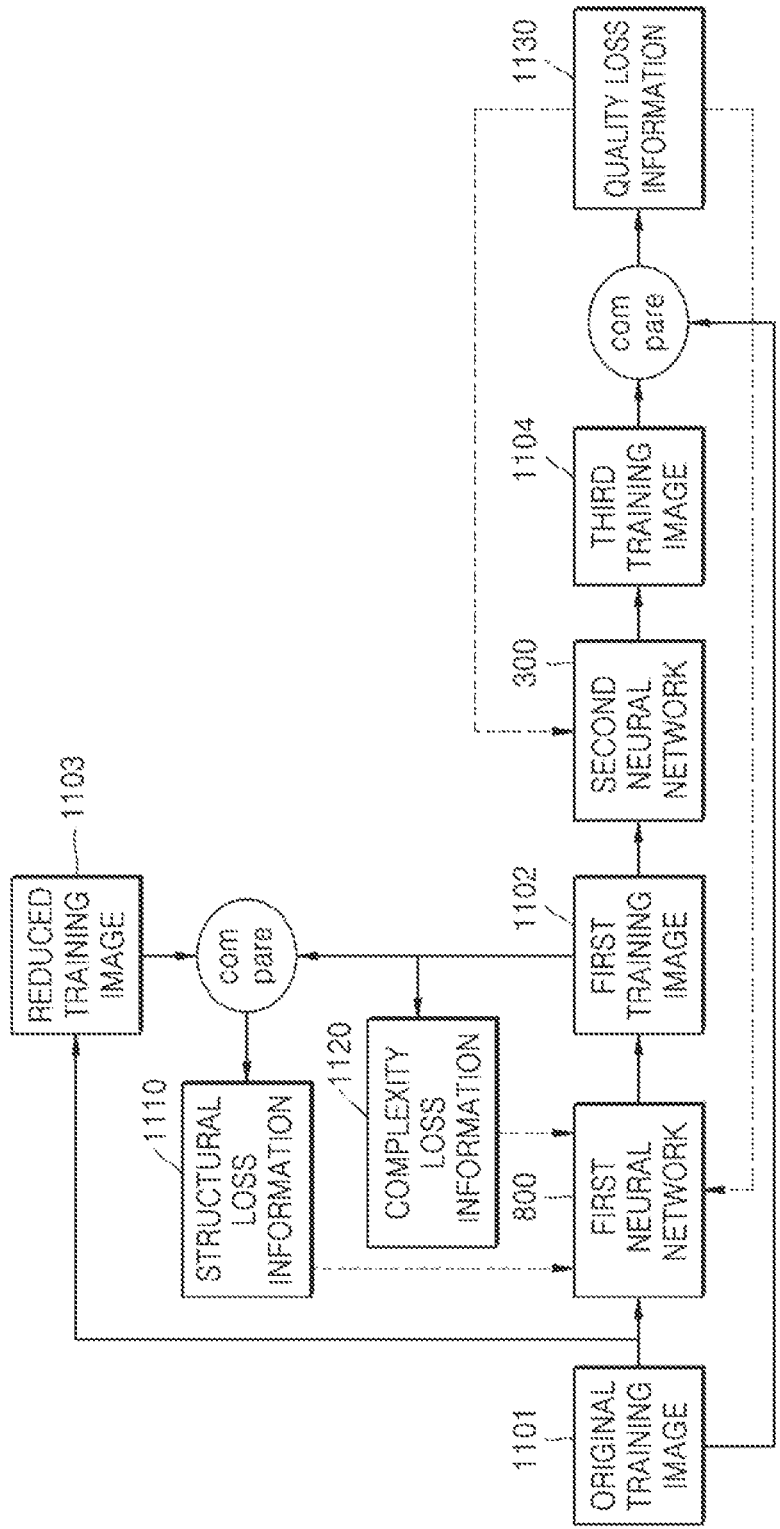
FIG. 11 is a diagram illustrating a method of training a first neural network and a second neural network.

FIG. 11 is a diagram illustrating a method of training the first neural network 800 and the second neural network 300.

In an embodiment of the disclosure, the original image 105 that is AI encoded through the AI encoding process is reconstructed to the third image 145 through the AI decoding process. In order to maintain similarity between the original image 105 and the third image 145 obtained as a result of the AI decoding, correlation between the AI encoding process and the AI decoding process is required. For example, information lost in the AI encoding process must be able to be reconstructed in the AI decoding process. To this end, the joint training of the first neural network 800 and the second neural network 300 is required.

Ultimately, for a more accurate AI decoding, it is necessary to reduce quality loss information 1130 corresponding to a result of comparison between an original training image 1101 and a third training image 1104 illustrated in FIG. 11. Therefore, the quality loss information 1130 is used for both the training of the first neural network 800 and the training of the second neural network 300.

First, a training process illustrated in FIG. 11 will be described.

In FIG. 11, the original training image 1101 is an image to be AI-downscaled, and a first training image 1102 is an image that is AI-downscaled from the original training image 1101. Also, the third training image 1104 is an image that is AI-upscaled from the first training image 1102.

The original training image 1101 includes a still image or a moving image including a plurality of frames. In an embodiment of the disclosure, the original training image 1101 may include a luma image extracted from a still image or a moving image including a plurality of frames. Also, in an embodiment of the disclosure, the original training image 1101 may include a patch image extracted from a still image or a moving image including a plurality of frames. When the original training image 1101 includes a plurality of frames, the first training image 1102, the second training image, and the third training image 1104 also include a plurality of frames. When a plurality of frames of the original training image 1101 are sequentially input to the first neural network 800, a plurality of frames of the first training image 1102, the second training image, and the third training image 1104 may be sequentially obtained through the first neural network 800 and the second neural network 300.

For the joint training of the first neural network 800 and the second neural network 300, the original training image 1101 is input to the first neural network 800. The original training image 1101 input to the first neural network 800 is AI-downscaled and output as the first training image 1102, and the first training image 1102 is input to the second neural network 300. The third training image 1104 is output as a result of AI-upscaling the first training image 1102.

Referring to FIG. 11, the first training image 1102 is input to the second neural network 300. According to an implementation, the second training image obtained through the first encoding process and the first decoding process of the first training image 1102 may be input to the second neural network 300. In order to input the second training image to the second neural network, any one of MPEG-2, H.264, MPEG-4, HEVC, VC-1, VP8, VP9, and AV1 may be used. For example, any one codec of MPEG-2, H.264, MPEG-4, HEVC, VC-1, VP8, VP9, and AV1 may be used to perform the first encoding process on the first training image 1102 and the first decoding process on image data corresponding to the first training image 1102.

Referring to FIG. 11, apart from outputting the first training image 1102 through the first neural network 800, a reduced training image 1103 that is legacy-downscaled from the original training image 1101 is obtained. The legacy downscale may include at least one of a bilinear scale, a bicubic scale, a lanczos scale, or a stair step scale.

In order to prevent the structural features of the first image 115 from significantly deviating based on the structural features of the original image 105, the reduced training image 1103 that preserves the structural features of the original training image 1101 is obtained.

Before the progress of training, the first neural network 800 and the second neural network 300 may be set with predetermined neural network setting information. As the training progresses, structural loss information 1110, complexity loss information 1120, and quality loss information 1130 may be determined.

The structural loss information 1110 may be determined based on a result of comparison between the reduced training image 1103 and the first training image 1102. In one example, the structural loss information 1110 may correspond to a difference between structural information of the reduced training image 1103 and structural information of the first training image 1102. The structural information may include various features that may be extracted from luminance of an image, contrast, and an image such as histogram. The structural loss information 1110 indicates to what extent the structural information of the original training image 1101 is maintained in the first training image 1102. As the structural loss information 1110 is smaller, the structural information of the first training image 1102 becomes similar to the structural information of the original training image 1101.

The complexity loss information 1120 may be determined based on spatial complexity of the first training image 1102. In one example, as the spatial complexity, a total variance value of the first training image 1102 may be used. The complexity loss information 1120 is related to the bitrate of the image data obtained by performing a first encoding process on the first training image 1102. As the complexity loss information 1120 is smaller, the bitrate of the image data is smaller.

The quality loss information 1130 may be determined based on a result of comparison between the original training image 1101 and the third training image 1104. The quality loss information 1130 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VI F) value, or a video multimethod assessment fusion (VMAF) value with respect to the difference between the original training image 1101 and the third training image 1104. The quality loss information 1130 indicates to what extent the third training image 1104 is similar to the original training image 1101. As the quality loss information 1130 is smaller, the third training image 1104 is more similar to the original training image 1101.

Referring to FIG. 11, the structural loss information 1110, the complexity loss information 1120, and the quality loss information 1130 are used for the training of the first neural network 800, and the quality loss information 1130 is used for the training of the second neural network 300. For example, the quality loss information 1130 is used for the training of both the first neural network 800 and the second neural network 300.

The first neural network 800 may update the parameters so that final loss information determined based on the structural loss information 1110, the complexity loss information 1120, and the quality loss information 1130 is reduced or minimized. Also, the second neural network 300 may update the parameters so that the quality loss information 1130 is reduced or minimized.

Final loss information for the training of the first neural network 800 and the second neural network 300 may be determined as in Equation 1 below:

$$\text{Loss}DS = a*\text{structural loss information} + b*\text{complexity loss information} + c*\text{quality loss information}$$

$$\text{Loss}US = d*\text{quality loss information} \qquad \text{[Equation 1]}$$

In Equation 1, LossDS represents the final loss information to be reduced or minimized for the training of the first neural network 800, and LossUS represents the final loss information to be reduced or minimized for the training of the second neural network 300. Also, a, b, c, and d may correspond to the predetermined certain weights.

For example, the first neural network 800 updates the parameters in a direction in which LossDS of Equation 1 is decreased, and the second neural network 300 updates parameters in a direction in which LossUS is decreased. When the parameters of the first neural network 800 are updated according to LossDS derived in the training process, the first training image 1102 obtained based on the updated parameters becomes different from the first training image 1102 of the previous training process. Accordingly, the third training image 1104 also becomes different from the third training image 1104 of the previous training process. When the third training image 1104 becomes different from the third training image 1104 of the previous training process, the quality loss information 1130 is also newly determined and the second neural network 300 updates the parameters accordingly. When the quality loss information 1130 is newly determined, LossDS is also newly determined. Thus, the first neural network 800 updates the parameters according to the newly determined LossDS. For example, the parameter update of the first neural network 800 causes the parameter update of the second neural network 300, and the parameter update of the second neural network 300 causes the parameter update of the first neural network 800. In other words, because the first neural network 800 and the second neural network 300 are joint-trained through sharing of the quality loss information 1130, the parameters of the first neural network 800 and the parameters of the second neural network 300 may be optimized with correlation with each other.

Referring to Equation 1, LossUS may be determined according to the quality loss information 1130, but embodiments are not limited thereto. LossUS may be determined based on the quality loss information 1130 and at least one of the structural loss information 1110 or the complexity loss information 1120.

It has been described that the AI setter 238 of the AI decoding apparatus 200 and the AI setter 718 of the AI encoding apparatus 700 store a plurality of neural network setting information, and a method of training each of the pieces of neural network setting information stored in the AI setter 238 and the AI setter 718 will be described.

As described in connection with Equation 1, the first neural network 800 updates the parameters based on the degree of similarity between the structural information of the first training image 1102 and the structural information of the original training image 1101 (the structural loss information 1110), the bitrate of the image data obtained as a result of the first encoding process on the first training image 1102 (the complexity loss information 1120), and the difference between the third training image 1104 and the original training image 1101 (the quality loss information 1130).

For example, the parameters of the first neural network 800 may be updated so that the first training image 1102, which is similar to the structural information of the original training image 1101 and has a small bitrate of image data obtained when the first encoding process is performed, may be obtained and the second neural network 300 that performs an AI upscaling process on the first training image 1102 obtains the third training image 1104 similar to the original training image 1101.

As the weights a, b, and c in Equation 1 are adjusted, the directions in which the parameters of the first neural network 800 are optimized becomes different from each other. For example, when the weight b is determined to be relatively high, the parameters of the first neural network 800 may be updated with more importance to lowering the bitrate than the quality of the third training image 1104. Also, when the weight c is determined to be relatively high, the bitrate is higher. The parameters of the first neural network 800 may be updated with more importance to increasing the quality of the third training image 1104 than to maintaining the structural information of the original training image 1101.

Also, the directions in which the parameters of the first neural network 800 are optimized may become different from each other according to a type of a codec used to perform the first encoding process on the first training image 1102. This is because the second training image to be input to the second neural network 300 may change according to the type of the codec.

For example, the parameters of the first neural network 800 and the parameters of the second neural network 300 are updated in association with each other, based on the weight a, the weight b, the weight c, and the type of codec for performing the first encoding process on the first training image 1102. Therefore, when the weight a, the weight b, and the weight c are determined as certain values, the type of the codec is determined as a certain type, and then the first neural network 800 and the second neural network 300 are trained, the parameters of the first neural network 800 and the parameters of the second neural network 300 that are optimized in association with each other may be determined.

When the weight a, the weight b, the weight c, and the type of the codec are changed and then the first neural network 800 and the second neural network 300 are trained, the parameters of the first neural network 800 and the parameters of the second neural network 300 that are optimized in association with each other may be determined. For example, when the first neural network 800 and the second neural network 300 are trained while changing the weight a, the weight b, the weight c, and the type of the codec, a plurality of neural network setting information trained in association with each other may be determined by the first neural network 800 and the second neural network 300.

As described above with reference to FIG. 5, the pieces of neural network setting information of the first neural network 800 and the second neural network 300 may be mapped to pieces of information related to the first image. In order to establish such a mapping relationship, the first training image 1102 output from the first neural network 800 is first-encoded with a specific codec according to a specific bitrate, and the second training image obtained by first-decoding the bitstream obtained as a result of the first encoding process may be input to the second neural network 300. For example, by training the first neural network 800 and the second neural network 300 after setting the environment so that the first training image 1102 having a specific resolution is first-encoded at a specific bitrate by a specific codec, the resolution of the first training image 1102, the type of the codec used to perform the first encoding process on the first training image 1102, and a pair of neural network setting information mapped to the bitrate of the bitstream obtained as a result of the first encoding process on the first training image 1102 may be determined. By variously changing the resolution of the first training image 1102, the type of the codec used to perform the first encoding process on the first training image 1102, and the bitrate of the bitstream obtained according to the first encoding process on the first training image 1102, a mapping relationship between the pieces of neural network setting information of the first neural network 800 and the second neural network 300 and the information related to the first image may be determined.

Figure 12:
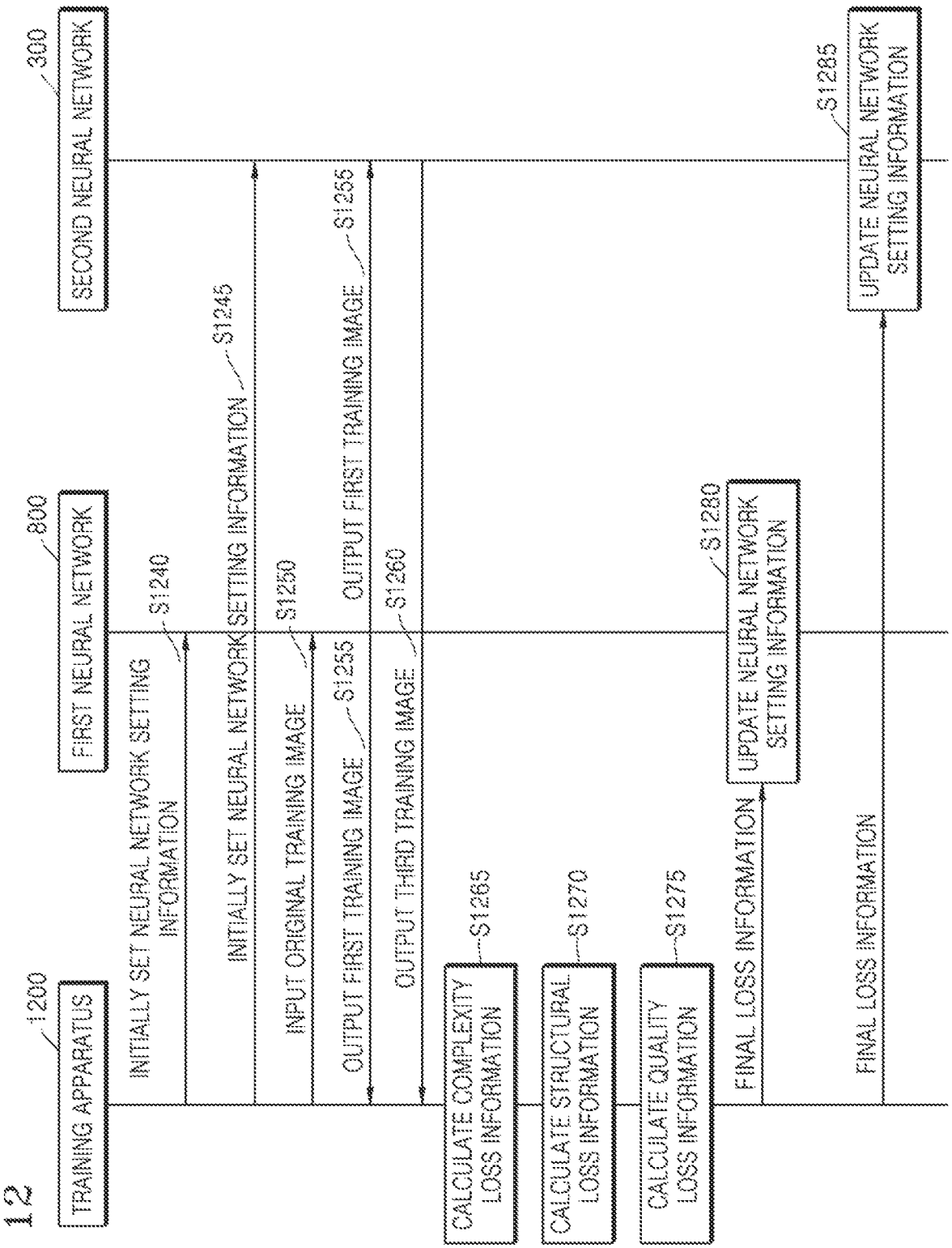
FIG. 12 is a diagram illustrating a process, performed by a training apparatus, of training a first neural network and a second neural network.

FIG. 12 is a diagram illustrating a process, performed by a training apparatus 1200, of training a first neural network 800 and a second neural network 300.

The training of the first neural network 800 and the second neural network 300 described above with reference to FIG. 11 may be performed by the training apparatus 1200. The training apparatus 1200 includes the first neural network 800 and the second neural network 300. The training apparatus 1200 may be, for example, the AI encoding apparatus 700 or a separate server. Neural network setting information of the second neural network 300 obtained as a result of training is stored in the AI decoding apparatus 200.

Referring to FIG. 12, the training apparatus 1200 initially sets neural network setting information of the first neural network 800 and the second neural network 300 (S1240 and S1245). Therefore, the first neural network 800 and the second neural network 300 may operate according to predetermined neural network setting information. The neural network setting information may include information about at least one of the number of convolution layers included in the first neural network 800 and the second neural network 300, the number of filter kernels for each convolution layer, the size of the filter kernel for each convolution layer, or the parameters of each filter kernel.

The training apparatus 1200 inputs the original training image 1101 to the first neural network 800 (S1250). The original training image 1101 may include at least one frame constituting a still image or a moving image.

The first neural network 800 processes the original training image 1101 according to the initially set neural network setting information, and outputs the first training image 1102 AI-downscaled from the original training image 1101 (S1255). FIG. 12 illustrates that the first training image 1102 output from the first neural network 800 is directly input to the second neural network 300, but the first training image 1102 output from the first neural network 800 may be input to the second neural network 300 by the training apparatus 1200. Also, the training apparatus 1200 may perform a first encoding process and a first decoding process on the first training image 1102 with a certain codec, and then input the second training image to the second neural network 300.

The second neural network 300 processes the first training image 1102 or the second training image according to the initially set neural network setting information, and outputs the third training image 1104 AI-upscaled from the first training image 1102 or the second training image (S1260).

The training apparatus 1200 calculates (obtains) complexity loss information 1120 based on the first training image 1102 (S1265).

The training apparatus 1200 calculates structural loss information 1110 by comparing the reduced training image 1103 with the first training image 1102 (S1270).

The training apparatus 1200 calculates quality loss information 1130 by comparing the original training image 1101 with the third training image 1104 (S1275).

The first neural network 800 updates the initially set neural network setting information through a back propagation process based on final loss information (S1280). The training apparatus 1200 may calculate final loss information for the training of the first neural network 800 based on the complexity loss information 1120, the structural loss information 1110, and the quality loss information 1130.

The second neural network 300 updates the initially set neural network setting information through a back propagation process based on the quality loss information or the final loss information (S1285). The training apparatus 1200 may calculate the final loss information for the training of the second neural network 300 based on the quality loss information 1130.

Then, the training apparatus 1200, the first neural network 800, and the second neural network 300 update the neural network setting information while repeating the processes S1250 to S1285 until the final loss information is minimized. At this time, while the processes are repeated, the first neural network 800 and the second neural network 300 operate according to the neural network setting information updated in the previous process.

Table 1 below shows the effects of the case in which the original image 105 is encoded and decoded by HEVC and the case in which the original image 105 is AI encoded and AI decoded according to the embodiment of the disclosure.

TABLE 1

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |

TABLE 1-continued

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_06 | | | 46.3 | 23.0 | 95.99 | 95.61 |
| | | Average | 46.11 | 22.25 | 94.10 | 94.85 |

As may be seen from Table 1, although the subjective image quality in the case in which content including 300 frames of 8K resolution is AI encoded and AI decoded according to the embodiment of the disclosure is higher than the subjective image quality in the case in which content is encoded and decoded by HEVC, the bitrate is reduced by 50% or more.

The AI encoding apparatus 700 and the AI decoding apparatus 200 described above may be useful in a server-client structure. For example, the server obtains the first image 115 by AI-downscaling the original image 105 according to the image request of the client, and transmits, to the client, AI-encoding data including image data obtained as a result of encoding the first image 115.

The client obtains the second image 135 by decoding the image data, and displays the third image 145 obtained through AI upscaling of the second image 135.

In general, because the capacity of a storage medium (e.g., a memory, a hard disk, a solid state drive (SDD), etc.) of the server is very large, no severe problem occurs even when a large number of original images 105 are continuously stored. However, when the AI encoding apparatus 700 described above is implemented as an electronic apparatus that does not have a large storage medium capacity, such as a mobile device such as a smartphone, a laptop computer, or a tablet PC, it may be difficult to store the original image 105 itself. For example, when an image having an 8 k resolution is captured by an electronic apparatus, it may be difficult to capture an image for a long time due to a limitation of a storage capacity, and it may be impossible to store other data when an image having an 8 k resolution is stored.

Therefore, there is a need for a method capable of preventing the storage capacity of the electronic apparatus from being saturated when the original image 105 having a high resolution is stored.

Embodiments of the disclosure described below may be useful in, for example, a mobile-client structure. For example, the mobile device may AI-downscale and encode the high-resolution original image 105 in advance, thereby preventing the storage capacity from being saturated due to the large size of the original image 105.

The mobile device may provide first image data of the first image 115 AI-downscaled from the original image 105 to the client according to the client's request or the user's request, and may provide second image data of the third image 145 AI-upscaled from the second image 135 to the client according to the function of the client.

Hereinafter, an AI encoding process and an AI decoding process for preventing the storage capacity from being saturated due to the large-sized original image 105 will be described with reference to FIGS. 13 to 24.

Figure 13:
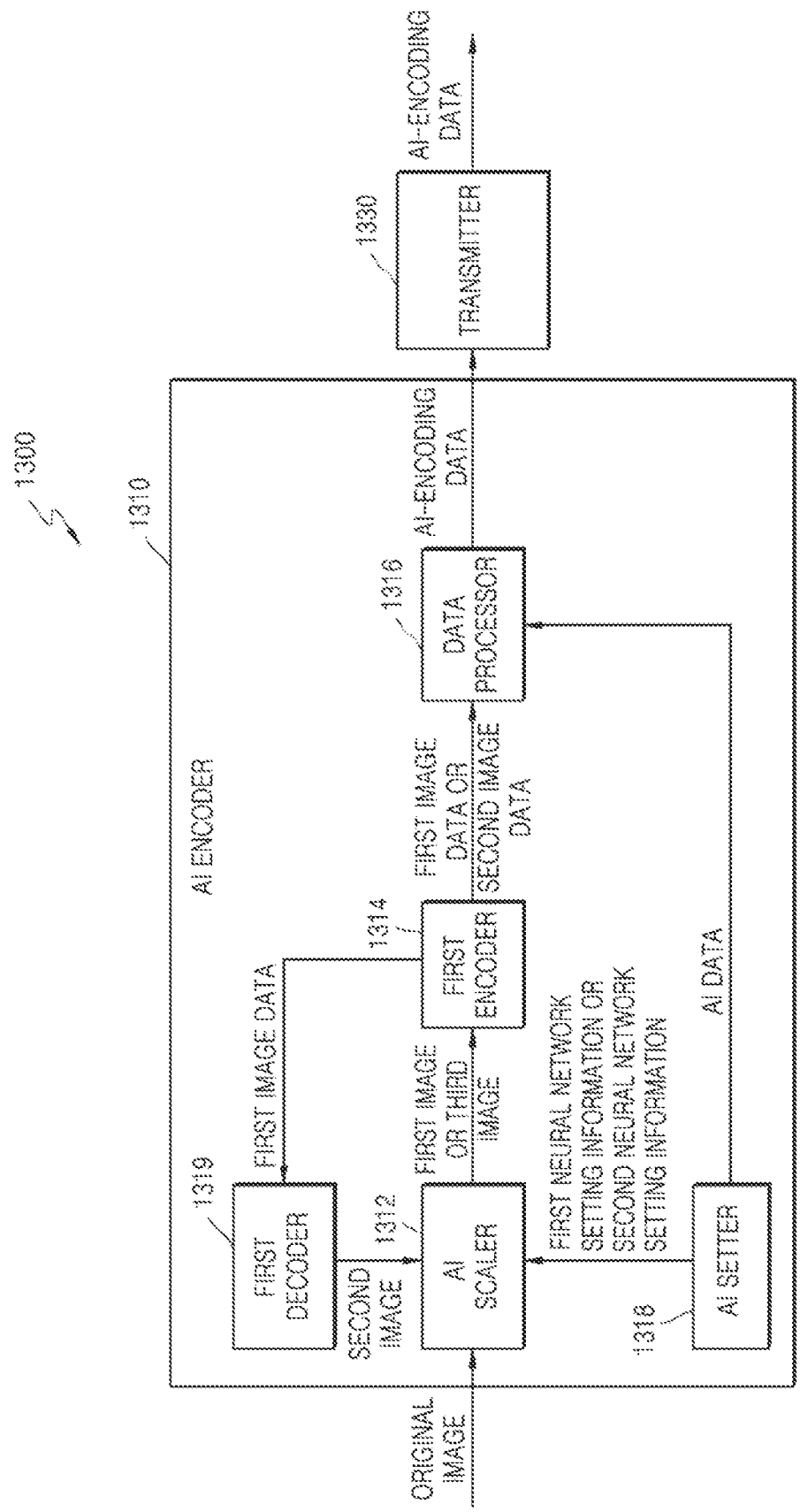
FIG. 13 is a block diagram illustrating a configuration of an image providing apparatus according to an embodiment of the disclosure.

FIG. 13 is a block diagram illustrating a configuration of an image providing apparatus 1300, according to an embodiment of the disclosure.

Referring to FIG. 13, the image providing apparatus 1300 may include an AI encoder 1310 and a transmitter 1330. The AI encoder 1310 may include an AI scaler 1312, a first encoder 1314, a data processor 1316, an AI setter 1318, and a first decoder 1319.

In FIG. 13, the AI encoder 1310 and the transmitter 1330 are illustrated as separate devices, but the AI encoder 1310 and the transmitter 1330 may be implemented through a single processor. In this case, the AI encoder 1310 and the transmitter 1330 may be implemented by a combination of dedicated processors, or may be implemented by a combination of software and a general-purpose processor such as an AP, a CPU, or a GPU. Also, in the case of a dedicated processor, the dedicated processor may include a memory for implementing the embodiment of the disclosure, or may include a memory processor for using an external memory.

Also, the AI encoder 1310 and the transmitter 1330 may include a plurality of processors. In this case, the AI encoder 1310 and the transmitter 1330 may be implemented by a combination of dedicated processors, or may be implemented by a combination of software and a plurality of general-purpose processors such as an AP, a CPU, or a GPU.

In an embodiment of the disclosure, the first encoder 1314 and the first decoder 1319 may be implemented as a first processor, the AI scaler 1312, the data processor 1316, and the AI setter 1318 may be implemented as a second processor that is different from the first processor, and the transmitter 1330 may be implemented as a third processor that is different from the first processor and the second processor.

The AI encoder 1310 obtains an original image 105. The AI encoder 1310 may obtain the original image 105 captured by a camera of the image providing apparatus 1300, or may obtain the original image 105 received from an external device via a network.

The AI encoder 1310 obtains performance information of a display apparatus to reproduce an image. The AI encoder 1310 obtains performance information of the display apparatus when a request for providing an image is received from the display apparatus or the user. The performance information of the display apparatus may be received from the display apparatus, or may be input from the user.

The image providing apparatus 1300 may further include a receiver that receives the original image 105 and the performance information of the display apparatus.

The performance information of the display apparatus may include information indicating whether an AI upscaling function is supported.

The AI encoder 1310 may perform only an AI encoding process on the original image 105 or may perform an AI encoding process and an AI decoding process on the original image 105, according to whether the display apparatus supports the AI upscaling function.

Operations of components included in the AI encoder 1310 will be described in detail below.

The AI scaler 1312 AI obtains the first image 115 by downscaling the original image 105. The AI scaler 1312 may AI-downscale the original image 105 through a first neural network to which neural network setting information is applied. The first neural network used by the AI scaler 1312 may have the structure of the first neural network 800 illustrated in FIG. 8, but the structure of the first neural network is not limited to the first neural network 800 illustrated in FIG. 8.

Hereinafter, neural network setting information applicable to the first neural network for AI downscaling is referred to as "first neural network setting information," and neural network setting information applicable to the second neural network is referred to as "second neural network setting information." The first neural network setting information (or the second neural network setting information) may include information about at least one of the number of convolution layers included in the first neural network (or the second neural network), the number of filter kernels for each convolution layer, or parameters of each filter kernel.

The AI setter 1318 provides the first neural network setting information for AI downscaling to the AI scaler 1312, and the AI scaler 1312 AI downscales the original image 105 based on the first neural network setting information.

The number of first neural network setting information stored in the AI setter 1318 may be one or more. When one piece of first neural network setting information is stored in the AI setter 1318, the AI setter 1318 transmits one piece of first neural network setting information to the AI scaler 1312. When a plurality of first neural network setting information are stored in the AI setter 1318, the AI setter 1318 selects first neural network setting information to be used for AI downscaling from among the pieces of first neural network setting information, and transmits the selected first neural network setting information to the AI scaler 1312.

One or more pieces of first neural network setting information stored in the AI setter 1318 and one or more pieces of second neural network setting information for AI upscaling will be described with reference to FIGS. 17 to 20.

The AI setter 1318 provides, to the data processor 1316, AI data related to the AI downscaling of the original image 105. As described above, the AI data includes information that enables the AI upscaler of the display apparatus to AI upscale the second image 135 to an upscale target corresponding to a downscale target of the first neural network.

In one example, the AI data may include difference information between the original image 105 and the first image 115.

In another example, the AI data may include information related to the first image 115. The information related to the first image 115 may include information about at least one of a resolution of the first image 115, a bitrate of the image data obtained as a result of the encoding process on the first image 115, or a codec type used to perform the encoding process on the first image 115.

In another example, the AI data may include an identifier of prearranged neural network setting information so that the AI upscaling process is performed on the second image 135 as the upscale target corresponding to the downscale target of the first neural network.

In another example, the AI data may include second neural network setting information settable in the second neural network.

The first encoder 1314 obtains first image data by encoding the first image 115. The first image data generated by the first encoder 1314 may be stored in a storage medium of the image providing apparatus 1300.

The first Image data includes data obtained as a result of encoding the first image 115. The first image data may include data obtained based on pixel values of the first image 115, for example, residual data that is the difference between the first image 115 and predicted data of the first image 115. Also, the first image data includes pieces of information used in the process of performing the encoding process on the first image 115. For example, the first image data may include prediction mode information used to encode the first image 115, motion information, information related to quantization parameters used to encode the first image 115, and the like.

When a request for providing an image is received from the display apparatus or the user and the display apparatus supports the AI upscaling function, the first image data and the AI data are provided from the first encoder 1314 and the AI configurer 1318 to the data processor 1316.

The data processor 1316 generates AI-encoding data including the first image data received from the first encoder 1314 and the AI data received from the AI setter 1318.

In an embodiment of the disclosure, the data processor 1316 may generate the AI-encoding data including the first image data and the AI data in separate states. For example, the AI data may be included in a VSIF of an HDMI stream.

In another embodiment of the disclosure, the data processor 1316 may include the AI data in the first image data obtained as a result of the encoding process performed by the first encoder 1314, and may generate the AI-encoding data including the corresponding first image data. For example, the data processor 1316 may generate image data in the form of one bitstream by combining a bitstream corresponding to the first image data and a bitstream corresponding to the AI data. To this end, the data processor 1316 may express the AI data as bits having a value of 0 or 1, that is, a bitstream. In an embodiment of the disclosure, the data processor 1316 may include a bitstream corresponding to the AI data in SEI, which is an additional information area of the bitstream obtained as a result of the encoding process.

The AI-encoding data is transmitted to the transmitter 1330. The transmitter 1330 transmits, to the display apparatus, the AI-encoding data obtained as a result of AI encoding via a network.

When the request for providing the image is received from the display apparatus or the user and the display apparatus does not support the AI upscaling function, the first image data obtained by the first encoder 1314 is provided to the first decoder 1319.

The first decoder 1319 obtains a second image 135 by decoding the first image data, and provides the second image 135 to the AI scaler 1312.

The AI scaler 1312 obtains a third image 145 by AI-upscaling the second image 135. The AI scaler 1312 may AI-upscale the second image 135 through a second neural network to which second neural network setting information is applied. The second neural network used by the AI scaler 1312 may have the structure of the second neural network 300 illustrated in FIG. 3, but the structure of the second neural network is not limited to the second neural network 300 illustrated in FIG. 3.

When the AI setter 1318 provides the second neural network setting information for AI upscaling to the AI scaler 1312, but the display apparatus does not support the AI upscaling function, the AI data related to AI downscaling of the original image 105 and the AI data related to AI upscaling of the second image 135 may not be provided to the data processor 1316. This is because, when the display apparatus is not able to perform AI upscaling, the AI data is not able to be used even when the AI data is received from the image providing apparatus 1300.

According to an implementation, even when the display apparatus does not support the AI upscaling function, the AI setter 1318 may provide, to the data processor 1316, the AI data related to AI downscaling of the original image 105 and/or the AI data related to AI upscaling of the second image 135.

The AI scaler 1312 provides, to the first encoder 1314, the third image 145 obtained through AI upscaling of the second image 135, and the first encoder 1314 obtains second image data by encoding the third image 145.

The second Image data includes data obtained as a result of decoding the second image 135. The second image data may include data obtained based on pixel values of the second image 135, for example, residual data that is the difference between the second image 135 and predicted data of the second image 135. Also, the second image data includes pieces of information used in the process of performing the encoding process on the second image 135. For example, the second image data may include prediction mode information used to encode the second image 135, motion information, information related to quantization parameters used to encode the second image 135, and the like.

The first encoder 1314 provides the second image data to the data processor 1316.

The data processor 1316 generates AI-encoding data including the second image data received from the first encoder 1314. When the AI data is received from the AI setter 1318, the data processor 1316 generates AI-encoding data including the second image data and the AI data.

The AI-encoding data is transmitted to the transmitter 1330. The transmitter 1330 transmits, to the display apparatus, the AI-encoding data obtained as a result of AI encoding via a network.

According to an embodiment of the disclosure, when the original image 105 is obtained, the image providing apparatus 1300 may obtain the first image 115 by performing an AI downscaling process on the original image 105, and may delete the original image 105 from the storage medium.

The image providing apparatus 1300 stores the first image 115 (for example, first image data) having a resolution lower than that of the original image 105 instead of the original image 105, thereby preventing the storage capacity of the storage medium from being saturated.

Also, the image providing apparatus 1300 transmits, to the display apparatus, the AI encoded data generated through AI encoding, or transmits, to the display apparatus, the second image data generated through AI encoding and AI decoding, based on whether the display apparatus to reproduce the image supports the AI upscaling function. Therefore, the high-resolution third image 145 may be reproduced through the display apparatus.

On the other hand, as described above, because the original image 105 and the third image 145, which have high resolution, occupy a large storage space, it is important to quickly delete the original image 105 and the third image 145 in order to more stably maintain the storage capacity of the image providing apparatus 1300.

For the AI downscaling of the original image 105 and the encoding of the third image 145, it is necessary to temporarily store the original image 105 and the third image 145 in the storage medium. In order to secure the storage space, it is necessary to minimize the storage time of the original image 105 and the third image 145.

In an embodiment of the disclosure, by performing the AI downscaling process on the original image 105 and the encoding process on the third image 145 in units of frames, it is possible to prevent the storage capacity from being saturated due to high resolution of the original image 105 and the third image 145. This will be described with reference to FIGS. 14 to 16.

Hereinafter, a frame constituting the original image 105 is referred to as an "original frame," and a frame constituting the first image 115 is referred to as a "first frame." Also, a frame constituting the second image 135 is referred to as a "second frame," and a frame constituting the third image 145 is referred to as a "third frame."

Figure 14:
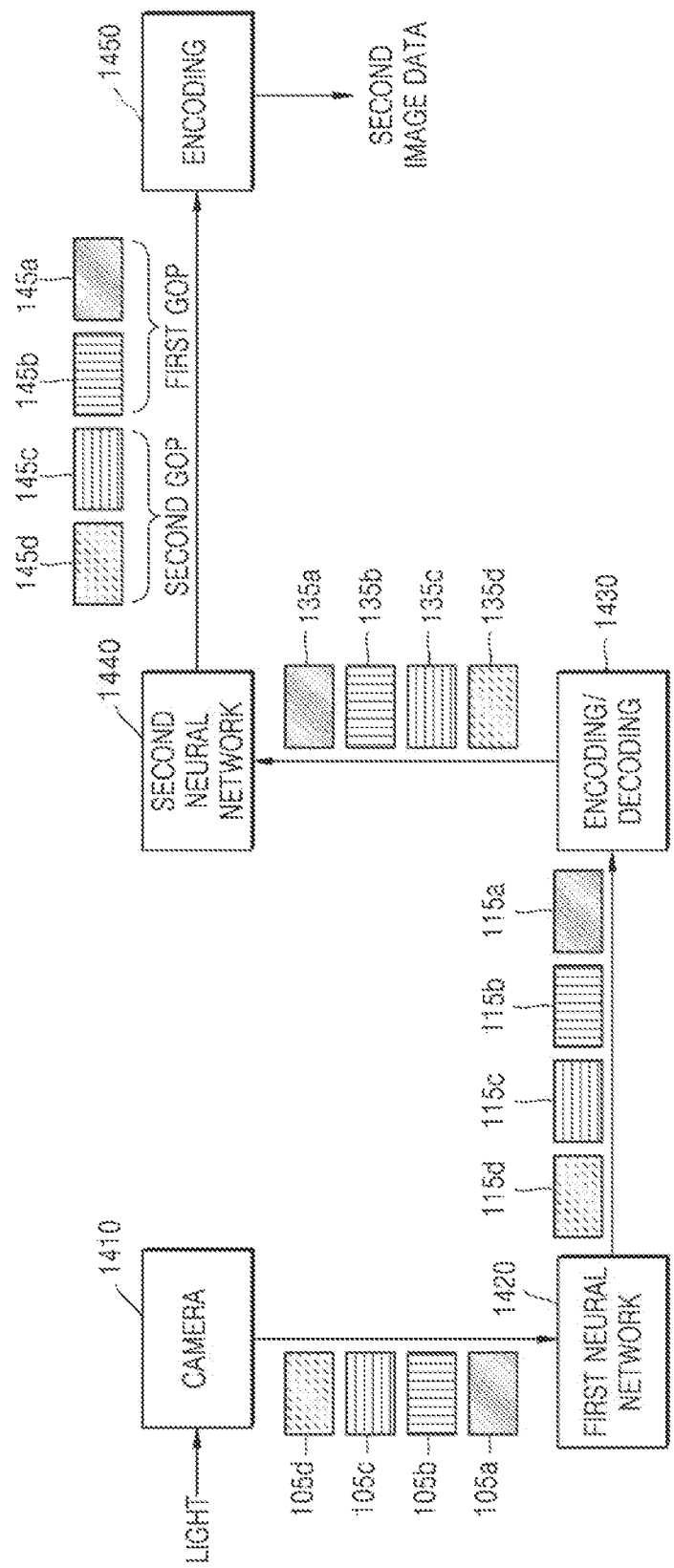
FIG. 14 is a diagram illustrating a process of processing original frames of an original image.

FIG. 14 is a diagram illustrating a process of processing original frames when the display apparatus does not support the AI upscaling function.

Referring to FIG. 14, a camera 1410 sequentially obtains an original frame a 105a, an original frame b 105b, an original frame c 105c, and an original frame d 105d in response to external light.

The original frame a 105a, the original frame b 105b, the original frame c 105c, and the original frame d 105d are sequentially AI-downscaled by a first neural network 1420. FIG. 14 illustrates only four original frames constituting the original image 105, but this is for simplicity of explanation, and the number of frames constituting the original image 105 may vary.

The original frames being obtained by the camera 1410 is an example. The original frames may be obtained from an external device via a network.

As the original frame a 105a, the original frame b 105b, the original frame c 105c, and the original frame d 105d are sequentially input, the first neural network 1420 outputs a first frame a 115a, a first frame b 115b, a first frame c 115c, and a first framed 115d corresponding to the original frame a 105a, the original frame b 105b, the original frame c 105c, and the original frame d 105d, respectively.

The image providing apparatus 1300 deletes an original frame that has been AI-downscaled by the first neural network 1420 among the original frame a 105a, the original frame b 105b, the original frame c 105c, and the original frame d 105d. Therefore, the number of original frames stored in the image providing apparatus 1300 may be minimized. For example, while the original frames are sequentially obtained by the camera 1410, the AI downscaling by the first neural network 1420 may be sequentially performed on the original frames, and the original frames that the AI downscaling is completed may be sequentially deleted.

For example, when the original frame a 105a is obtained by the camera 1410 and the AI downscaling is performed on the original frame a 105a to obtain the first frame a 115a, the image providing apparatus 1300 deletes the original frame a 105a. When the original frame b 105b is obtained by the camera 1410, the image providing apparatus 1300 inputs the original frame b 105b to the first neural network 1420 so that the original frame b 105b is AI-downscaled, and deletes the original frame b 105b that the AI downscaling is completed.

When the display apparatus supports AI upscaling function, first image data is obtained through encoding on the first frame a 115a, the first frame b 115b, the first frame c 115c, and the first frame d 115d, and AI-encoding data including the first image data is transmitted to the display apparatus, as described above.

When the display apparatus does not support the AI upscaling function, a second frame a 135a, a second frame b 135b, a second frame c 135c, and a third frame d 145d are obtained by performing an encoding and decoding process 1430 on the first frame a 115a, the first frame b 115b, the first frame c 115c, and the first frame d 115d.

Compared with the sequential deletion of the original frames after the AI downscaling is completed, the first frame a 115a, the first frame b 115b, the first frame c 115c, and the first frame d 115d may be deleted together after the encoding is completed. Also, the second frame a 135a, the second frame b 135b, the second frame c 135c, and the second frame d 135d may also be deleted after the AI upscaling through a second neural network 1440 is completed. This is because the first frames and the second frames may not occupy a large storage space because the resolutions thereof are not high.

The second frame a 135a, the second frame b 135b, the second frame c 135c, and the second frame d 135d are sequentially processed by the second neural network 1440, and the third frame a 145a, the third frame b 145b, the third frame c 145c, and the third frame d 145d, which are AI-upscaled, are sequentially obtained from the second neural network 1440.

While the high-resolution original frames 105a, 105b, 105c, and 105d are deleted immediately after the AI downscaling is complete, the high-resolution third frames 145a, 145b, 145c, and 145d are not deleted immediately after the AI upscaling on the second frames 135a, 135b, 135c, and 135d is completed. This is because the third frames 145a, 145b, 145c, and 145d are additionally subjected to an encoding process 1450.

In general, frames constituting an image are encoded through intra-prediction or inter-prediction. The intra-prediction is an encoding tool that reduces spatial redundancy by predicting samples in a frame from neighboring samples, and the inter-prediction is an encoding tool that reduces temporal redundancy by predicting samples in a frame from samples in other frames. Because the intra-prediction and the inter-prediction are variously used in general-purpose codec such as HEVC, detailed descriptions thereof are omitted.

A group of frames referencing each other for inter-prediction is referred to as a group of pictures (GOP). In order to predict a sample in one third frame from another third frame, another third frame has to exist when the encoding process 1450 is performed on one third frame. Therefore, when the encoding process 1450 on the third frames constituting the GOP is completed, the image providing apparatus 1300 deletes the third frames that the encoding is completed.

Referring to FIG. 14, the third frame a 145a and the third frame b 145b constitute a first GOP, and the third frame c 145c and the third frame d 145d constitute a second GOP.

The encoding process 1450 is performed on the third frame a 145a and the third frame b 145b to obtain second image data corresponding to the third frame a 145a and the third frame b 145b, and the encoding process 1450 is performed on the third frame c 145c and the third frame d 145d to obtain second image data corresponding to the third frame c 145c and the third frame d 145d.

When the encoding process 1450 on the third frame a 145a and the third frame b 145b constituting the first GOP is completed, the image providing apparatus 1300 deletes the third frame a 145a and the third frame b 145b, and when the encoding process 1450 on the third frame c 145c and the third frame d 145d constituting the second GOP is completed, the image providing apparatus 1300 deletes the third frame c 145c and the third frame d 145d.

Because the image providing apparatus 1300 performs the encoding process 1450 in units of GOPs and immediately deletes the GOPs that the encoding is completed, the number of third frames stored in the image providing apparatus 1300 may be minimized.

Figure 15:
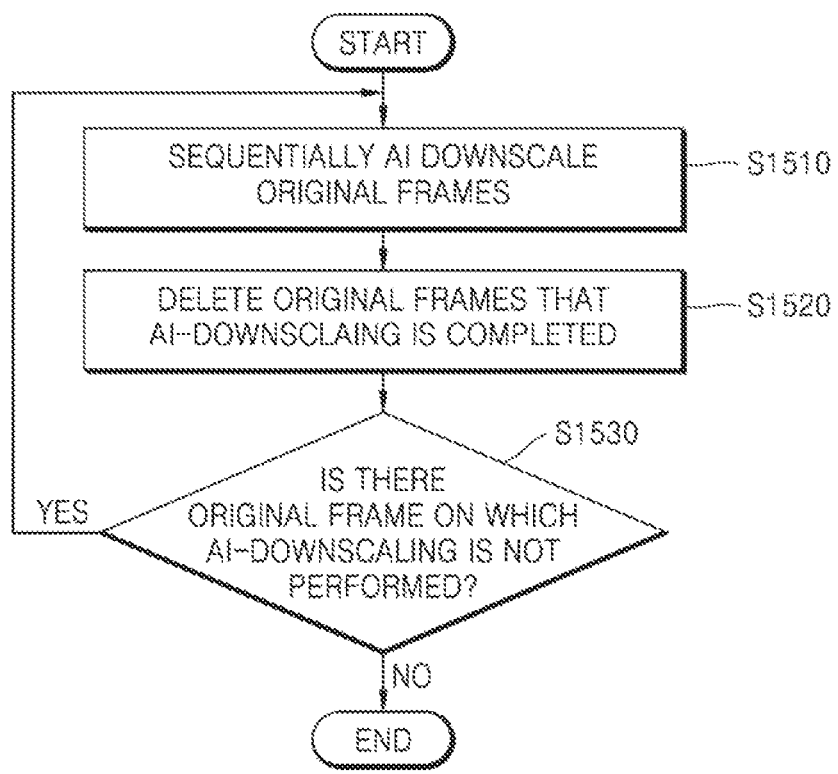
FIG. 15 is a flowchart of a process of AI-downscaling original frames of an original image.

FIG. 15 is a flowchart of a process of AI-downscaling the original frames illustrated in FIG. 14.

In operation S1510, the image providing apparatus 1300 sequentially AI downscales the original frames. The AI downscaling may be performed on the original frames based on the first neural network 1420.

In operation S1520, the image providing apparatus 1300 deletes the original frames that the AI downscaling is completed.

In operation S1530, the image providing apparatus 1300 determines whether there is an original frame that the AI downscaling is not completed.

When there is an original frame that the AI downscaling is not completed, the image providing apparatus 1300 repeats operations S1510, S1520, and S1530.

Figure 16:
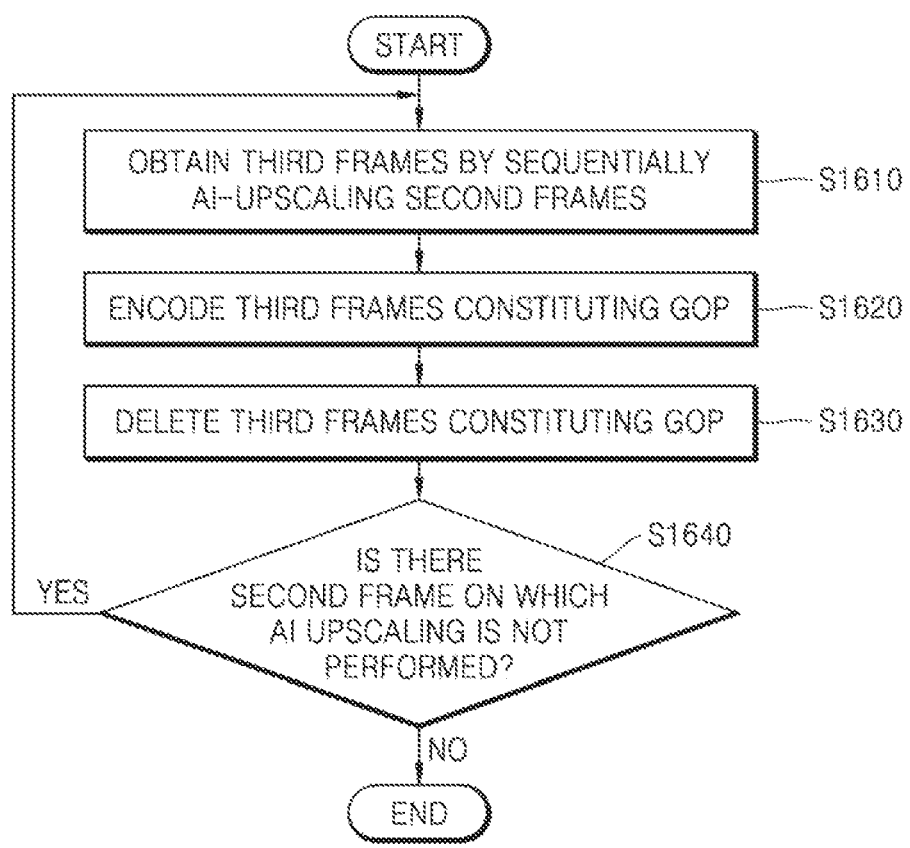
FIG. 16 is a flowchart of a process of AI-upscaling second frames of a second image.

FIG. 16 is a flowchart of a process of AI-upscaling the second frames illustrated in FIG. 14.

In operation S1610, the image providing apparatus 1300 obtains third frames by sequentially AI-upscaling the second frames. The AI upscaling may be performed on the second frames based on the second neural network 1440.

In operation S1620, the image providing apparatus 1300 encodes the third frames constituting the GOP. When the image providing apparatus 1300 obtains the third frames constituting the GOP while sequentially AI-upscaling the second frames, the image providing apparatus 1300 may encode the third frames constituting the corresponding GOP.

In operation S1630, the image providing apparatus 1300 deletes the third frames constituting the GOP that the encoding is completed.

In operation S1640, the image providing apparatus 1300 determines whether there is a second frame that the AI upscaling is not completed.

When there is a second frame that the AI upscaling is not completed, the image providing apparatus 1300 repeats operations S1610, S1620, S1630, and S1640.

Hereinafter, first neural network setting information settable in the first neural network 1420 and second neural network setting information settable in the second neural network 1440 will be described with reference to FIGS. 17 to 20.

FIG. 17 is a diagram illustrating first neural network setting information applicable to the first neural network 1420 for AI downscaling and second neural network setting information applicable to the second neural network 1440 for AI upscaling.

The AI setter 1318 may store one "A1" neural network setting information applicable to the first neural network 1420 and one "A2" neural network setting information applicable to the second neural network 1440.

The AI setter 1318 provides the "A1" neural network setting information to the AI scaler 1312, so that the original image 105 is AI-downscaled through the first neural network 1420 to which the "A1" neural network setting information is applied (or set).

Also, the AI setter 1318 provides the "A2" neural network setting information to the AI scaler 1312, so that the second image 135 is AI-downscaled through the first neural network 1440 to which the "A2" neural network setting information is applied (or set).

A pair of "A1" neural network setting information and "A2" neural network setting information may be obtained through the joint training of the first neural network 1420 and the second neural network 1440 described with reference to FIGS. 11 and 12.

For example, the first neural network 1420 and the second neural network 1440 are set with predetermined neural network setting information. The first neural network 1420 updates the neural network setting information so that final loss information determined from the structural loss information 1110, the complexity loss information 1120, and the quality loss information 1130 is reduced or minimized. The second neural network 1440 updates the neural network setting information so that final loss information determined from the quality loss information 1130 is reduced or minimized.

A pair of "A1" neural network setting information and "A2" neural network setting information corresponding to each other may be obtained by the joint training of the first neural network 1420 and the second neural network 1440 through the sharing of the quality loss information 1130.

In an embodiment of the disclosure, the scaling factor of the first neural network 1420 to which the "A1" neural network setting information is applied may be 1/d (d is a rational number greater than 1), and the scaling factor of the second neural network 1440 to which the "A2" neural network setting information is applied may be d (d is a rational number greater than 1). The AI scaler 1312 may AI-upscale the second image 135 n times (n is a natural number greater than or equal to 1), based on the scaling factor of the second neural network 1440 to which the "A2" neural network setting information is applied, the resolution of the second image 135, and the supported resolution of the display apparatus. AI upscaling n times indicates that the image output from the second neural network 1440 is input again to the second neural network 1440 (n−1) times. For example, when the second image 135 is AI-upscaled three times, the second image 135 is processed by the second neural network 1440 and AI-upscaled, the output image of the second neural network 1440 is processed again by the second neural network 1440 and AI-upscaled, and the output image of the second neural network 1440 is processed again by the second neural network 1440 to obtain the third image 145.

The case in which the AI scaler 1312 AI upscales the second image 135 twice or more times may be useful when the supported resolution of the display apparatus is higher than the resolution of the third image 145 obtained by AI-downscaling the second image 135 once.

For example, when the scaling factor of the second neural network 1440 to which the "A2" neural network setting information is applied is 2, the supported resolution of the display apparatus is 16 k, and the resolution of the second image 135 input to the second neural network 1440 is 2 k, the AI scaler 1312 may obtain the third image 145 of a 16 k resolution by AI-upscaling the second image 135 three times through the second neural network 1440 to which the "A2" neural network setting information is applied.

The supported resolution information of the display apparatus may be included in performance information of the display apparatus that is received by the AI encoder 1310. The supported resolution of the display apparatus may indicate at least one of resolutions that the display may reproduce. For example, the supported resolution of the display apparatus may indicate the highest resolution that the display may reproduce.

FIG. 18 is a diagram illustrating a plurality of first neural network setting information applicable to the first neural network 1420 for AI downscaling and a plurality of second neural network setting information applicable to the second neural network 1440 for AI upscaling.

The AI setter 1318 may store the pieces of first neural network setting information applicable to the first neural network 1420 and the pieces of second neural network setting information applicable to the second neural network 1440. The pieces of first neural network setting information and the pieces of second neural network setting information may correspond to each other. The pieces of first neural network setting information and the pieces of second neural network setting information may correspond to each other one-to-one.

The pieces of first neural network setting information and the pieces of second neural network setting information may be obtained through the joint training of the first neural network 1420 and the second neural network 1440 described with reference to FIGS. 11 and 12.

For example, the first neural network 1420 and the second neural network 1440 are set with predetermined neural network setting information. The first neural network 1420 updates the neural network setting information so that final loss information determined from the structural loss information 1110, the complexity loss information 1120, and the quality loss information 1130 is reduced or minimized. The second neural network 1440 updates the neural network setting information so that final loss information determined from the quality loss information 1130 is reduced or minimized.

When the first neural network 1420 and the second neural network 1440 are joint-trained while changing the training conditions, the pieces of first neural network setting information and the pieces of second neural network setting information corresponding to each other may be obtained. Because the method of obtaining the pieces of first neural network setting information and the pieces of second neural network setting information corresponding to each other has been described with reference to FIGS. 11 and 12, detailed descriptions thereof are omitted.

The AI setter 1318 selects first neural network setting information corresponding to the downscale target of the original image 105 from among the pieces of first neural network setting information and provides the selected first neural network setting information to the AI scaler 1312.

The AI setter 1318 obtains one or more pieces of input information. In an embodiment of the disclosure, the input information may include at least one of a target resolution of a first image 115, a target bitrate of first image data, a bitrate type of the first image data (e.g., a variable bitrate type, a constant bitrate type, an average bitrate type, etc.), a color format to which the AI downscaling is applied (a luma component, a chroma component, a red component, a green component, or a blue component, etc.), a codec type for encoding the first image 115, compression history information, a resolution of the original image 105, a type of the original image 105, or content included in the original image 105 (e.g., whether an image is a person image or a landscape image, etc.).

One or more pieces of input information may be stored in advance in the image providing apparatus 1300, or may include information input from a user.

The AI setter 1318 may determine the downscale target based on the input information and select first neural network setting information corresponding to the downscale target from among the pieces of first neural network setting information. When pieces of information constituting the first neural network setting information (e.g., the number of convolution layers, the number of filter kernels for each convolution layer, the parameters of each filter kernel, etc.) are stored in the form of a lookup table, the AI setter 1318 may select the first neural network setting information by combining some selected from among values of the lookup table according to the downscale target.

In an embodiment of the disclosure, the AI setter 1318 may transmit at least a part of the input information to the first encoder 1314, so that the first encoder 1314 may encode the first image 115 with a bitrate of a specific value, a bitrate of a specific type, and a specific codec.

In an embodiment of the disclosure, the AI setter 1318 may determine the downscale target based on at least one of a compression rate (e.g., a difference in resolution between the original image 105 and the first image 115, a target bitrate, etc.), a compression quality (e.g., a bitrate type), compression history information, or a type of the original image 105, and select the first neural network setting information corresponding to the downscale target.

As another example, the AI setter 1318 may determine the downscale target by using the compression history information stored in the image providing apparatus 1300 and select the first neural network setting information corresponding to the downscale target. For example, the coding quality or compression rate that the user prefers may be determined according to the compression history information that may be used by image providing apparatus 1300, and the downscale target may be determined according to the coding quality determined based on the compression history information. For example, the resolution, image quality, etc. of the first image 115 may be determined according to the coding quality that has been used most frequently, based on the compression history information.

As another example, when the coding quality that has been used more frequently than a certain threshold value is confirmed from the compression history information (e.g., an average quality of coding qualities that have been used more frequently than a certain threshold value), the AI setter 1318 may determine the downscale target based on the confirmed coding quality.

As another example, the AI setter 1318 may determine the downscale target based on the resolution, type (e.g., file format), etc. of the original image 105.

In an embodiment of the disclosure, the AI setter 1318 may independently select the first neural network setting information for each certain number of original frames, and provide the independently selected first neural network setting information to the AI scaler 1312.

In another embodiment of the disclosure, the AI setter 1318 may divide the original frames into a certain number of groups, and may independently select the first neural network setting information for each group. The same or different first neural network setting information may be select for each group. The number of original frames included in the groups may be equal or different for each group.

In another embodiment of the disclosure, the AI setter 1318 may independently select the first neural network setting information for each original frame. The same or different first neural network setting information may be select for each original frame.

When the AI upscaling is required, the AI setter 1318 selects second neural network setting information corresponding to the first neural network setting information selected for AI downscaling from among a plurality of second neural network setting information, and provides the selected second neural network setting information to the AI scaler 1312.

The AI scaler 1312 AI upscales the second image 135 through the second neural network by using the second neural network setting information received from the AI setter 1318.

In an embodiment of the disclosure, the scaling factor of the first neural network 1420 to which the first neural network setting information selected for AI downscaling from among the pieces of first neural network setting information is applied may be 1/d (d is a rational number greater than 1), and the scaling factor of the second neural network 1440 to which the second neural network setting information corresponding to the first neural network setting information selected for AI downscaling is applied may be d (d is a rational number greater than 1).

The AI scaler 1312 may AI-upscale the second image 135 n times (n is a natural number greater than or equal to 1), based on the scaling factor of the second neural network 1440 to which the second neural network setting information is applied, the resolution of the second image 135, and the supported resolution of the display apparatus. The case in which the AI scaler 1312 AI upscales the second image 135 twice or more times may be useful when the supported resolution of the display apparatus is higher than the resolution of the third image 145 obtained by AI-downscaling the second image 135 once.

For example, when the scaling factor of the second neural network 1440 to which the "B2" neural network setting information is applied is 2, the supported resolution of the display apparatus is 16 k, and the resolution of the second image 135 input to the second neural network 1440 is 2 k, the AI scaler 1312 may obtain the third image 145 of a 16 k resolution by AI-upscaling the second image 135 three times through the second neural network 1440 to which the "B2" neural network setting information is applied.

The supported resolution information of the display apparatus may be included in performance information of the display apparatus that is received by the AI encoder 1310. The supported resolution of the display apparatus may indicate at least one of resolutions that the display may reproduce. For example, the supported resolution of the display apparatus may indicate the highest resolution that the display may reproduce.

FIG. 19 is a diagram illustrating first neural network setting information applicable to the first neural network 1420 for AI downscaling and a plurality of second neural network setting information applicable to the second neural network 1440 for AI upscaling.

As illustrated in FIG. 19, the AI setter 1318 may store one "A1" neural network setting information settable in the first neural network 1420 and a plurality of second neural network setting information settable in the second neural network 1440, that is, "A2" neural network setting information, "B2" neural network setting information, "C2" neural network setting information, and "D2" neural network setting information. Although FIG. 19 illustrates four pieces of second neural network setting information applicable to the second neural network 1440, the number of pieces of second neural network setting information applicable to the second neural network 1440 may vary.

The "A2" neural network setting information among the pieces of second neural network setting information may correspond to the "A1" neural network setting information. As described with reference to FIG. 17, the "A1" neural network setting information and the "A2" neural network setting information may be obtained through the joint training of the first neural network 1420 and the second neural network 1440.

The scaling factor of the "A1" neural network setting information may be ¼, and the scaling factors of the "A2" neural network setting information, the "B2" neural network setting information, the "C2" neural network setting information, and the "D2" neural network setting information may be 4, 2, 3, and 8, respectively. Because the "A1" neural network setting information and the "A2" neural network setting information are obtained through the joint training of the first neural network 1420 and the second neural network 1440, the scaling factor of the "A1" neural network setting information and the scaling factor of the "A2" neural network setting information have a reciprocal relationship.

The "B2" neural network setting information, the "C2" neural network setting information, and the "D2" neural network setting information may be obtained through an individual training of the second neural network 1440 in a state in which the "A1" neural network setting information is set in the first neural network 1420 and the "A2" neural network setting information is set in the second neural network 1440. The individual training process of the second neural network 1440 will be described below with reference to FIGS. 21 and 22.

When the AI upscaling of the second image 135 is required, the AI setter 1318 selects second neural network setting information to be applied to the second neural network 1440 from among the pieces of second neural network setting information. In an embodiment of the disclosure, the AI setter 1318 may select second neural network setting information to be applied to the second neural network 1440, based on the supported resolution of the display apparatus.

For example, when the resolution of the original image 105 is 8 k, the resolution of the first image 115 obtained by the first neural network 1420 to which the "A1" neural network setting information is applied is 2 k. Because the resolution of the second image 135 is equal to the resolution of the first image 115, the resolution of the second image 135 is also 2 k. When the supported resolution of the display apparatus is 8 k, the AI setter 1318 selects the "A2" neural network setting information having a scaling factor of 4 and provides the selected "A2" neural network setting information to the AI scaler 1312. Also, when the supported resolution of the display apparatus is 4 k, the AI setter 1318 selects the "B2" neural network setting information having a scaling factor of 2 and provides the selected "B2" neural network setting information to the AI scaler 1312.

The AI scaler 1312 may obtain the third image 145 matching the supported resolution of the display apparatus by AI-upscaling the second image 135 by using the second neural network setting information provided from the AI setter 1318.

FIG. 20 is a diagram illustrating a plurality of first neural network setting information applicable to the first neural network 1420 for AI downscaling and a plurality of second neural network setting information applicable to the second neural network 1440 for AI upscaling.

As illustrated in FIG. 20, the AI setter 1318 may store the pieces of first neural network setting information settable to the first neural network 1420 and the pieces of second neural network setting information settable to the second neural network 1440.

Referring to FIG. 20, it may be seen that there are the pieces of second neural network setting information corresponding to one piece of first neural network setting information. The pieces of first neural network setting information settable in the first neural network 1420 may correspond to the pieces of first neural network setting information described above with reference to FIG. 18. Also, there are a plurality of second neural network setting information having different scaling factors corresponding to the pieces of first neural network setting information.

For example, as illustrated in FIG. 20, there may be "A2-1" neural network setting information, "A2-2" neural network setting information, "A2-3" neural network setting information, and "A2-4" neural network setting information, which are applicable to the second neural network 1440, with respect to the "A1" neural network setting information applicable to the first neural network 1420. As described with reference to FIG. 17, the "A1" neural network setting information and the "A2-1" neural network setting information may be obtained through the joint training of the first neural network 1420 and the second neural network 1440. The "A2-2" neural network setting information, the "A2-3" neural network setting information, and the "A2-4" neural network setting information may be obtained through an individual training of the second neural network 1440, which will be described with reference to FIGS. 21 and 22, in a state in which the "A1" neural network setting information is set in the first neural network 1420 and the "A2-1" neural network setting information is set in the second neural network 1440.

Also, there may be "B2-1" neural network setting information, "B2-2" neural network setting information, "B2-3" neural network setting information, and "B2-4" neural network setting information, which are applicable to the second neural network 1440, with respect to the "B1" neural network setting information applicable to the first neural network 1420. As described with reference to FIG. 17, the "B1" neural network setting information and the "B2-1" neural network setting information may be obtained through the joint training of the first neural network 1420 and the second neural network 1440. The "B2-2" neural network setting information, the "B2-3" neural network setting information, and the "B2-4" neural network setting information may be obtained through an individual training of the second neural network 1440, which will be described with reference to FIGS. 21 and 22, in a state in which the "B1" neural network setting information is set in the first neural network 1420 and the "B2-1" neural network setting information is set in the second neural network 1440.

The AI setter 1318 selects first neural network setting information to be applied to the first neural network 1420 from among the pieces of first neural network setting information and provides the selected first neural network setting information to the AI scaler 1312. Because the method, performed by the AI setter 1318, of selecting the first neural network setting information has been described with reference to FIG. 18, detailed descriptions thereof are omitted.

When the AI upscaling of the second image 135 is required, the AI setter 1318 may select second neural network setting information to be applied to the second neural network 1440 according to the supported resolution of the display apparatus from among the pieces of second neural network setting information having different scaling factors corresponding to the first neural network setting information selected for AI downscaling, and may provide the selected second neural network setting information to the AI scaler 1312.

For example, when the resolution of the original image 105 is 8 k and the "A1" neural network setting information having a scaling factor of ¼ is selected for AI downscaling, the resolution of the first image 115 is 2 k. When the supported resolution of the display apparatus is 4 k, the AI setter 1318 may select the "A2-2" neural network setting information capable of outputting the 4 k third image 145 for AI upscaling.

As another example, when the resolution of the original image 105 is 8 k and the "A1" neural network setting information having a scaling factor of ¼ is selected for AI downscaling, the resolution of the first image 115 is 2 k. When the supported resolution of the display device is 16 k, the AI setter 1318 may select the "A2-4" neural network setting information capable of outputting the 16 k third image 145 for AI upscaling.

Hereinafter, the individual training of the second neural network 1440 will be described with reference to FIGS. 21 and 22.

Figure 21:
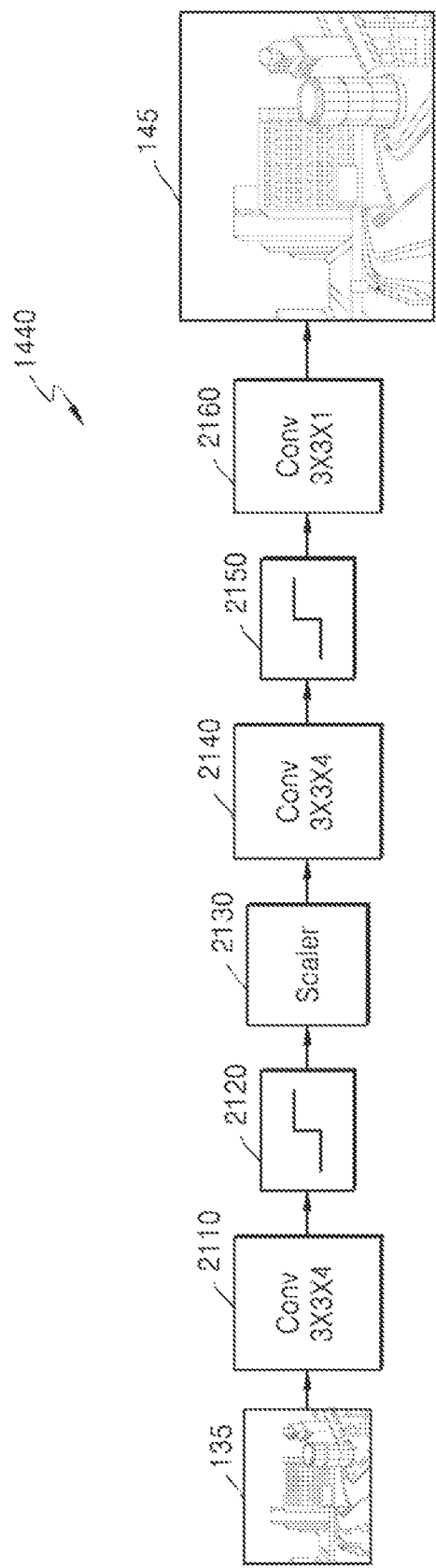
FIG. 21 is a diagram illustrating a second neural network according to an embodiment of the disclosure.

FIG. 21 is a diagram illustrating the second neural network 1440 according to an embodiment of the disclosure.

The second neural network 1440 illustrated in FIG. 21 may include a first convolution layer 2110, a first activation layer 2120, a scaler 2130, a second convolution layer 2140, a second activation layer 2150. and a third convolution layer 2160.

Compared with the second neural network 300 illustrated in FIG. 3, the second neural network 1440 illustrated in FIG. 21 further includes the scaler 2130. The scaler 2130 is used to obtain second neural network setting information having various scaling factors. In other words, it is necessary to control the scaling factor of the scaler 2130 in order to obtain pieces of second neural network setting information having various scaling factors described with reference to FIGS. 19 and 20.

The scaler 2130 may be a bilinear scaler, a bicubic scaler, a lanczos scaler, or a stair step scaler. According to an implementation, the scaler 2130 may be implemented as a convolution layer.

Because the first convolution layer 2110, the first activation layer 2120, the second convolution layer 2140, the second activation layer 2150, and the third convolution layer 2160 are the same as those described with reference to FIG. 3, detailed descriptions thereof are omitted.

Figure 22:
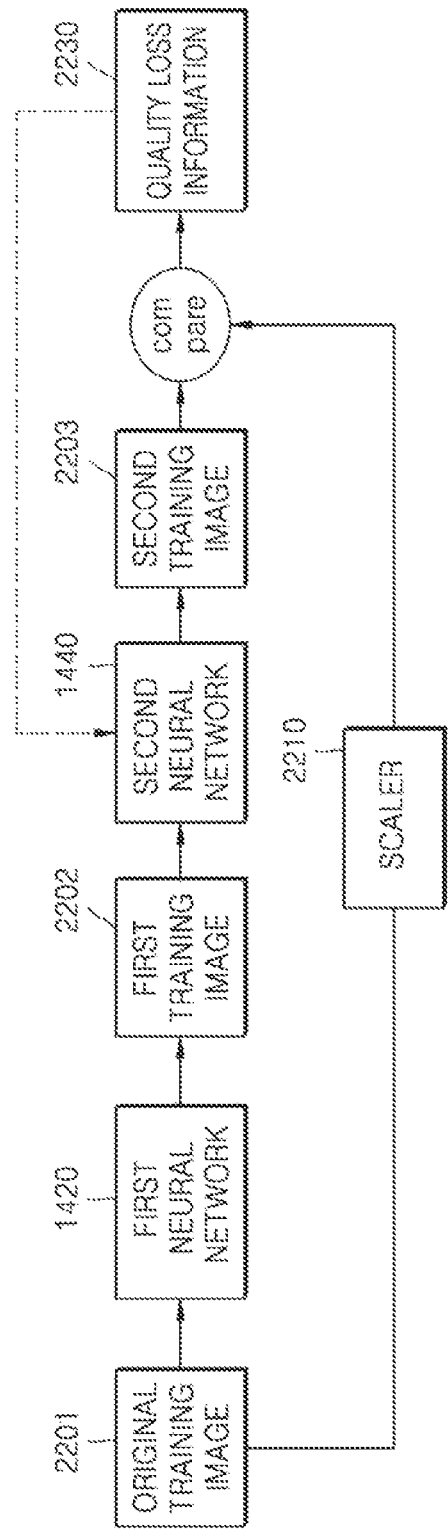
FIG. 22 is a diagram illustrating a method of individually training a second neural network, on which joint training with a first neural network has been completed.

FIG. 22 is a diagram illustrating a method of individually training the second neural network 1440, on which joint training with the first neural network 1420 has been completed.

In FIG. 22, an original training image 2201 is an image to be AI-downscaled, and a first training image 2202 is an image that is AI-downscaled from the original training image 2201. Also, a second training image 2203 is an image that is AI-upscaled from the first training image 2202.

The original training image 2201 includes a still image or a moving image including a plurality of frames. In an embodiment of the disclosure, the original training image 2201 may include a luma image extracted from a still image or a moving image including a plurality of frames. Also, in an embodiment of the disclosure, the original training image 2201 may include a patch image extracted from a still image or a moving image including a plurality of frames. When the original training image 2201 includes a plurality of frames, the first training image 2202 and the second training image 2203 also include a plurality of frames.

When a plurality of frames of the original training image 2201 are sequentially input to the first neural network 1420, a plurality of frames of the first training image 2202 and the second training image 2203 may be sequentially obtained through the first neural network 1420 and the second neural network 1440.

In FIG. 22, the first neural network 1420 and the second neural network 1440 are set with the first neural network setting information and the second neural network setting information, which are obtained through the joint training. The configuration value of the scaler 2130 illustrated in FIG. 21 is adjusted to control the scaling factor of the second neural network 1440. For example, when it is desired to obtain the second neural network setting information having a scaling factor of 2, the scaling factor of the scaler 2130 may be set to 2, and when it is desired to obtain the second neural network setting information having a scaling factor of 3, the scaling factor of the scaler 2130 may be set to 3.

For the individual training of the second neural network 1440, the original training image 2201 is input to the first neural network 1420. The first neural network 1420 operates according to the first neural network setting information obtained through the joint training of the first neural network 1420 and the second neural network 1440.

The original training image 2201 input to the first neural network 1420 is AI-downscaled and output as the first training image 2202, and the first training image 2202 is input to the second neural network 1440. The second training image 2203 is output as a result of AI-upscaling the first training image 2202.

Referring to FIG. 22, the first training image 2202 is input to the second neural network 1440. According to an implementation, the training image obtained through the encoding and decoding process of the first training image 2202 may be input to the second neural network 1440.

Apart from the input of the original training image 2201 to the first neural network 1420, the original training image 2201 is processed by the scaler 2210. The scaler 2210 may include at least one of a bilinear scaler, a bicubic scaler, a lanczos scaler, or a stair step scaler.

The scaler 2210 scales the original training image 2201 based on a ratio between the resolution of the second training image 2203 to be output from the second neural network 1440 according to the scaling factor of the second neural network 1440 and the resolution of the original training image 2201. For example, when the resolution of the second training image 2203 is output as 4 k through the control by the scaler 2130 included in the second neural network 1440 and the resolution of the original training image 2201 is 8 k, the scaler 2210 may reduce the resolution of the original training image 2201 by ½. The resolutions of the original training image 2201 and the second training image 2203 match each other in order to calculate loss information through comparison between the two images 2201 and 2203.

Quality loss information 2230 corresponding to the difference between the second training image 2203 output from the second neural network 1440 and the original training image 2201 scaled by the scaler 2210 is calculated. The quality loss information 2230 may include at least one of an L1-norm value, an L2-norm value, an SSIM value, a PSNR-HVS value, an MS-SSIM value, a VIF value, or a VMAF value with respect to the difference between the scaled original training image 2201 and the second training image 2203.

The quality loss information 2230 is used only for training the second neural network 1440. Neural network setting information set in the second neural network 1440 is updated so that the quality loss information 2230 is reduced or minimized. As illustrated in FIG. 22, the quality loss information 2230 is not used for training the first neural network 1420.

Second neural network setting information corresponding to various scaling factors may be obtained by individually training the second neural network 1440 while controlling the scaling factor of the scaler 2130 included in the second neural network 1440. For example, when the scaling factor of the scaler 2130 included in the second neural network 1440 is set to 2 and the second neural network 1440 is individually trained, second neural network setting information having a scaling factor of 2 is obtained. When the scaling factor of the scaler 2130 included in the second neural network 1440 is set to 3 and the second neural network 1440 is individually trained, second neural network setting information having a scaling factor of 3 is obtained.

FIG. 23 is a diagram illustrating a process, performed by a training apparatus 2300, of individually training a second neural network 1440.

The individual training of the second neural network 1440 may be performed by the training apparatus 2300. The training apparatus 2300 includes a first neural network 1420 and a second neural network 1440. The training apparatus 2300 may be, for example, the image providing apparatus 1300 or a separate server. Pieces of neural network setting information of the second neural network 1440 obtained as a result of training is stored in the image providing apparatus 1300.

Before the individual training of the second neural network 1440, first neural network setting information and second neural network setting information, which are obtained through the joint training of the first neural network 1420 and the second neural network 1440, are set in the first neural network 1420 and the second neural network 1440, respectively. The scaling factor of the scaler 2130 included in the second neural network 1440 is controlled according to the scaling factor of the second neural network setting information to be obtained.

Referring to FIG. 23, the training apparatus 2300 inputs the original training image 2201 to the first neural network 1420 (S2310). The original training image 2201 may include at least one frame constituting a still image or a moving image.

The first neural network 1420 processes the original training image 2201 according to the set first neural network setting information, and outputs the first training image 2202 AI-downscaled from the original training image 2201 (S2320). FIG. 23 illustrates that the first training image 2202 output from the first neural network 1420 is directly input to the second neural network 1440, but the first training image 2202 output from the first neural network 1420 may be input to the second neural network 1440 by the training apparatus 2300. Also, the training apparatus 2300 may encode and decode the first training image 2202 with a certain codec and then input the first training image to the second neural network 1440.

The second neural network 1440 processes the first training image 2202 or the training image obtained by encoding and decoding the first training image 2202, and outputs the second training image 2203 (S2330).

The training apparatus 2300 scales the original training image 2201 (S2340). The training apparatus 2300 scales the original training image 2201 to have the same resolution as that of the second training image 2203 output from the second neural network 1440.

The training apparatus 2300 calculates quality loss information 2230 by comparing the scaled original training image 2201 with the second training image 2203 (S2350).

The second neural network 1440 updates the neural network setting information through a back propagation process based on the final loss information determined from the quality loss information 2230 (S2360).

Then, the training apparatus 2300, the first neural network 1420, and the second neural network 1440 repeat operations S2310 to S2360 until the final loss information is minimized. At this time, while the processes are repeated, the second neural network 1440 operates according to the neural network setting information updated in the previous process.

FIG. 24 is a flowchart of an image providing method performed by the image providing apparatus 1300, according to an embodiment of the disclosure.

In operation S2410, the image providing apparatus 1300 obtains the first image 115 by performing AI downscaling on the original image 105. The image providing apparatus 1300 deletes an original frame that the AI downscaling is completed from among original frames constituting the original image 105, thereby preventing the storage capacity of the image providing apparatus 1300 from being saturated.

In operation S2420, the image providing apparatus 1300 obtains first image data by encoding the first image 115.

In operation S2430, when a request for providing an image is received from a display apparatus or a user, the image providing apparatus 1300 determines whether the display apparatus supports an AI upscaling function. The image providing apparatus 1300 may determine whether the display apparatus supports the AI upscaling function from performance information received from the display apparatus or the user.

In operation S2440, when the display apparatus does not support the AI upscaling function, the image providing apparatus 1300 obtains a second image 135 by decoding the first image data.

In operation S2450, the image providing apparatus 1300 obtains a third image 145 by AI-upscaling the second image 135.

In operation S2460, the image providing apparatus 1300 obtains second image data by encoding the third image 145. When the encoding of the third frame constituting a GOP from among third frames constituting the third image 145 is completed, the image providing apparatus 1300 may delete the third frames, thereby preventing the storage capacity of the image providing apparatus 1300 from being saturated.

In operation S2470, the image providing apparatus 1300 provides the second image data to the display apparatus. The display apparatus may reconstruct the third image 145 by decoding the second image data, and reproduce the reconstructed third image 145.

In operation S2430, when the display apparatus does not support the AI upscaling function, the image providing apparatus 1300 provides AI-encoding data including the first image data to the display apparatus. The display apparatus may obtain the third image 145 by AI-decoding the AI-encoding data, and may reproduce the obtained third image 145.

On the other hand, the structure of the display apparatus supporting the AI upscaling function may be the same as the structure of the AI decoding apparatus 200 illustrated in FIG. 2.

For example, the receiver 210 transmits, to the parser 232, the AI-encoding data received from the image providing apparatus 1300. The parser 232 transmits first image data to the first decoder 234 among pieces of the AI-encoding data, and transmits the AI data to the AI setter 238.

The first decoder 234 obtains the second image 135 by decoding the first image data, and transmits the second image 135 to the AI upscaler 236. The first decoder 234 may provide decoding-related information to the AI setter 238.

The AI setter 238 selects second neural network setting information to be used for AI upscaling, based on the AI data.

The AI setter 238 may store one or more pieces of second neural network setting information for AI upscaling. When one piece of second neural network setting information is stored in the AI setter 238, the AI setter 238 transmits one piece of second neural network setting information to the AI upscaler 236.

When a plurality of second neural network setting information are stored in the AI setter 238, the AI setter 238 selects second neural network setting information to be set in the second neural network 300 or 1440 from among the pieces of second neural network setting information based on the AI data, and transmits the selected second neural network setting information to the AI upscaler 236. The AI setter 238 may check the first neural network setting information set in the first neural network 1420 from the AI data, and may select the second neural network setting information corresponding to the checked first neural network setting information. Because the method of selecting the second neural network setting information from the AI data has been described in relation to the AI decoding apparatus 200, detailed descriptions thereof are omitted herein.

According to an implementation, the AI setter 238 may select the second neural network setting information corresponding to the supported resolution of the display apparatus from among the pieces of second neural network setting information having different scaling factors, and may transmit the selected second neural network setting information to the AI upscaler 236.

The AI upscaler 236 sets the second neural network 300 or 1440 with the second neural network setting information received from the AI setter 238, and obtains a third image 145 by AI-upscaling the second image 135 through the second neural network 300 or 1440. According to an implementation, the AI upscaler 236 may obtain the third image 145 by AI-upscaling the second image 135 n times (n is a natural number greater than or equal to 1) according to the supported resolution of the display apparatus.

The display apparatus may reproduce the third image 145 or, when necessary, may post-process the third image 145 and reproduce the post-processed third image 145.

The display apparatus that does not support the AI upscaling function may not include the AI upscaler 236 and the AI setter 238 from among the components included in the AI decoding apparatus 200 illustrated in FIG. 2. Therefore, the display apparatus obtains the third image 145 by decoding the second image data received from the image providing apparatus 1300. The display apparatus may reproduce the reconstructed third image 145, or may post-process the reconstructed third image 145 and reproduce the post-processed third image 145.

The above-described embodiments of the disclosure may be written as programs or instructions that may be executed on a computer, and the written programs or instructions may be stored in a medium.

A machine-readable storage medium may be provided in the form of a non-transitory storage medium. The "non-transitory storage medium" is a tangible device and only indicates not including a signal (e.g., electromagnetic wave). This term does not distinguish between a case in which data is stored semi-permanently in a storage medium and a case in which data is temporarily stored in a storage medium. For example, the "non-transitory storage medium" may include a buffer in which data is temporarily stored.

According to an embodiment of the disclosure, the methods according to various embodiments of the disclosure disclosed herein may be provided by being included in a computer program product. The computer program products may be traded between a seller and a buyer as commodities. The computer program product may be distributed in the form of a machine-readable storage medium (e.g., compact disc read only memory (CD-ROM)), or may be distributed (e.g., downloaded or uploaded) online, either via an application store (e.g., Play Store™) or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The model related to the neural network described above may be implemented as a software module. When implemented as a software module (e.g., a program module including instructions), the neural network model may be stored in a computer-readable recording medium.

Also, the neural network model may be integrated in the form of a hardware chip so as to be a part of the AI decoding apparatus 200, the AI encoding apparatus 700, the image providing apparatus 1300, and the display apparatus described above. For example, the neural network model may be manufactured in the form of a dedicated hardware chip for AI, or may be manufactured as a part of an existing general-purpose processor (e.g., a CPU or an application processor) or a dedicated graphic processor (e.g., a GPU).

Also, the neural network model may be provided in the form of downloadable software. A computer program product may include a product (e.g., a downloadable application) in the form of a software program that is electronically distributed through a manufacturer or an electronic market. For electronic distribution, at least a part of the software program may be stored in a storage medium or may be temporarily generated. In this case, the storage medium may be a server of a manufacturer or an electronic market, or a storage medium of a relay server.

The technical idea of the disclosure has been described in detail with reference to embodiments of the disclosure, but the technical idea of the disclosure is not limited to the above-described embodiments of the disclosure. Various modifications and changes may be made thereto by those of ordinary skill in the art within the scope of the technical idea of the disclosure.

What is claimed is:

1. An electronic apparatus configured to provide an image based on artificial intelligence (AI), the electronic apparatus comprising:
at least one processor configured to execute one or more instructions stored in the electronic apparatus to cause the electronic apparatus to:
obtain a first image by AI-downscaling an original image by using a downscaling neural network;
obtain first image data by encoding the first image;
obtain a second image by decoding the first image data;
obtain a third image by AI-upscaling the second image by using an upscaling neural network; and provide second image data obtained by encoding the third image to a first display apparatus based on the first display apparatus not supporting an AI upscaling function; and provide the first image data to a second display apparatus based on the second display apparatus supporting the AI upscaling function, wherein, as original frames included in the original image are sequentially AI-downscaled by using the downscaling neural network, first frames included in the first image are obtained, and wherein electronic apparatus is further configured to sequentially delete the original frames that the AI downscaling is completed.

2. The electronic apparatus of claim 1, further comprising a camera configured to obtain the original image.

3. The electronic apparatus of claim 1, wherein the electronic apparatus is further configured to provide the first image data to a second display apparatus based on the second display apparatus supporting an AI upscaling function.

4. The electronic apparatus of claim 1, wherein the electronic apparatus is further configured to:

obtain the first image by AI-downscaling the original image by using a downscaling neural network to which predetermined first neural network setting information is applied;

select second neural network setting information corresponding to a supported resolution of the first display apparatus from among a plurality of second neural network setting information; and obtain the third image by AI-upscaling the second image by using an upscaling neural network to which the selected second neural network setting information is applied.

5. The electronic apparatus of claim 4, wherein the predetermined first neural network setting information and second neural network setting information corresponding to the predetermined first neural network setting information from among the plurality of second neural network setting information are obtained through a joint training of the downscaling neural network and the upscaling neural network, and wherein second neural network setting information other than the second neural network setting information corresponding to the predetermined first neural network setting information from among the plurality of second neural network setting information is obtained through an individual training of the upscaling neural network after the joint training.

6. The electronic apparatus of claim 1, wherein the electronic apparatus is further configured to:

obtain the first image by AI-downscaling the original image by using a downscaling neural network to which predetermined first neural network setting information is applied; and obtain the third image by AI-upscaling the second image n times, where n is a natural number, through an upscaling neural network, based on a scaling factor of the upscaling neural network to which predetermined second neural network setting information is applied and a supported resolution of the first display apparatus.

7. The electronic apparatus of claim 1, wherein the electronic apparatus is further configured to:

select first neural network setting information for the AI downscaling from among a plurality of first neural network setting information;

obtain the first image by AI-downscaling the original image through a downscaling neural network to which the selected first neural network setting information is applied;

select second neural network setting information corresponding to the selected first neural network setting information from among a plurality of second neural network setting information; and obtain the third image by AI-upscaling the second image n times, where n is a natural number, through an upscaling neural network, based on a scaling factor of the upscaling neural network to which the selected second neural network setting information is applied and a supported resolution of the first display apparatus.

8. The electronic apparatus of claim 1, wherein, as second frames included in the second image are sequentially AI-upscaled by using the upscaling neural network, third frames included in the third image are obtained, and wherein the electronic apparatus is further configured to, based on third frames included in a group of pictures (GOP) being obtained through the AI upscaling, encode the third frames included in the GOP and delete the third frames included in the GOP that the encoding is completed.

9. The electronic apparatus of claim 1, wherein the electronic apparatus is further configured to:

receive performance information from the first display apparatus; and determine, from the performance information, whether an AI upscaling function is supported and the supported resolution of the first display apparatus.

10. An image providing method performed by an electronic apparatus using artificial intelligence (AI), the image providing method comprising:

obtaining a first image by AI-downscaling an original image by using a downscaling neural network;

obtaining first image data by encoding the first image;

obtaining a second image by decoding the first image data;

obtaining a third image by AI-upscaling the second image by using an upscaling neural network; and providing second image data obtained by encoding the third image to a first display apparatus based on the first display apparatus not supporting an AI upscaling function; and providing the first image data to a second display apparatus based on the second display apparatus supporting the AI upscaling function, wherein, as original frames included in the original image are sequentially AI-downscaled by using the downscaling neural network, first frames included in the first image are obtained, and wherein the original frames that the AI downscaling is completed are sequentially deleted.

11. The image providing method of claim 10, further comprising:

obtaining the original image by a camera.

12. The image providing method of claim 10, further comprising:

providing the first image data to a second display apparatus based on the second display apparatus supporting an AI upscaling function.

13. The image providing method of claim 10, further comprising:
- obtaining the first image by AI-downscaling the original image by a downscaling neural network to which predetermined first neural network setting information is applied;
- selecting second neural network setting information corresponding to a supported resolution of the first display apparatus from among a plurality of second neural network setting information; and
- obtaining the third image by AI-upscaling the second image by an upscaling neural network to which the selected second neural network setting information is applied.

14. The image providing method of claim 13, wherein the predetermined first neural network setting information and second neural network setting information corresponding to the predetermined first neural network setting information from among the plurality of second neural network setting information are obtained through a joint training of the downscaling neural network and the upscaling neural network, and
- wherein second neural network setting information other than the second neural network setting information corresponding to the predetermined first neural network setting information from among the plurality of second neural network setting information is obtained through an individual training of the upscaling neural network after the joint training.

15. The image providing method of claim 10, further comprising:
- obtaining the first image by AI-downscaling the original image by a downscaling neural network to which predetermined first neural network setting information is applied; and
- obtaining the third image by AI-upscaling the second image n times, where n is a natural number, through an upscaling neural network, based on a scaling factor of the upscaling neural network to which predetermined second neural network setting information is applied and a supported resolution of the first display apparatus.

16. The image providing method of claim 10, further comprising:
- selecting first neural network setting information for the AI downscaling from among a plurality of first neural network setting information;
- obtaining the first image by AI-downscaling the original image through a downscaling neural network to which the selected first neural network setting information is applied;
- selecting second neural network setting information corresponding to the selected first neural network setting information from among a plurality of second neural network setting information; and
- obtaining the third image by AI-upscaling the second image n times, where n is a natural number, through an upscaling neural network, based on a scaling factor of the upscaling neural network to which the selected second neural network setting information is applied and a supported resolution of the first display apparatus.

17. A non-transitory computer-readable recording medium having recorded thereon a program for causing a computer to perform the image providing method of claim 10.

* * * * *